(12) United States Patent
Thrash et al.

(10) Patent No.: US 9,278,826 B2
(45) Date of Patent: Mar. 8, 2016

(54) SYSTEM AND METHOD FOR PRODUCING A THREE-DIMENSIONAL DRY FIBER PREFORM

(71) Applicant: The Boeing Company, Chicago, IL (US)

(72) Inventors: Patrick J. Thrash, Eastvale, CA (US); Chad L. Boger, Lakewood, CA (US); Michael James Farrell, Orange, CA (US)

(73) Assignee: The Boeing Company, Chicago, IL (US)

( * ) Notice: Subject to any disclaimer, the term of this patent is extended or adjusted under 35 U.S.C. 154(b) by 454 days.

(21) Appl. No.: 13/910,857

(22) Filed: Jun. 5, 2013

(65) Prior Publication Data

US 2014/0360417 A1  Dec. 11, 2014

(51) Int. Cl.
*D05B 35/02* (2006.01)
*B65H 45/12* (2006.01)
*D05B 23/00* (2006.01)
*B29B 11/16* (2006.01)

(52) U.S. Cl.
CPC ............... *B65H 45/12* (2013.01); *B29B 11/16* (2013.01); *D05B 23/00* (2013.01); *D05B 35/02* (2013.01)

(58) Field of Classification Search
CPC ........ D05B 35/02; D05B 27/185; D05B 3/06; D05B 23/00; D05B 25/00; D05B 35/04
USPC ........... 112/120, 19, 76, 470.13, 155, 470.16, 112/118
See application file for complete search history.

(56) References Cited

U.S. PATENT DOCUMENTS

| | | | | | |
|---|---|---|---|---|---|
| 4,061,096 A | * | 12/1977 | Elsas | ...................... | D05B 11/00 112/118 |
| 4,427,139 A | * | 1/1984 | Depriest | ................. | D06F 71/22 223/2 |
| 4,506,611 A | * | 3/1985 | Parker | .................... | D05B 23/00 112/198 |
| 4,688,837 A | * | 8/1987 | Ball | ........................ | B25J 15/00 271/18.3 |
| 5,052,316 A | * | 10/1991 | Sakakibara | ............ | D05B 39/00 112/10 |
| 5,915,317 A | * | 6/1999 | Thrash | .................... | B29C 70/24 112/155 |
| 6,129,031 A | * | 10/2000 | Sarh | ....................... | D05B 25/00 112/470.13 |

(Continued)

FOREIGN PATENT DOCUMENTS

DE  102008057782  5/2010
WO  WO 02/42044  5/2002

OTHER PUBLICATIONS

European Search Report for EP 14170885 dated Nov. 17, 2014.

(Continued)

*Primary Examiner* — Tejash Patel

(57) ABSTRACT

A preform forming machine for producing a three-dimensional dry fiber preform may include a forming block assembly and a clamping plate assembly. The forming block assembly may have a forming table and a forming block and may be positionable in a series of forming block assemblies. The clamping plate assembly may have a clamping table and a clamping plate and may be positionable in a series of clamping plate assemblies arranged in opposing relation to the series of forming block assemblies. Each forming block may be configured to fold a ply stack over onto itself to form a web of a preform. Each clamping plate may be configured to clamp the ply stack to the forming table during the folding of the ply stack.

21 Claims, 30 Drawing Sheets

(56) References Cited

U.S. PATENT DOCUMENTS

| | | | |
|---|---|---|---|
| 6,698,396 B2 * | 3/2004 | Pfaeffle | F02D 41/402 |
| | | | 123/294 |
| 8,042,767 B2 | 10/2011 | Thrash et al. | |

OTHER PUBLICATIONS

Canadian Office Action for CA Appl. No. 2,850,067, dated Jun. 30, 2015.

* cited by examiner

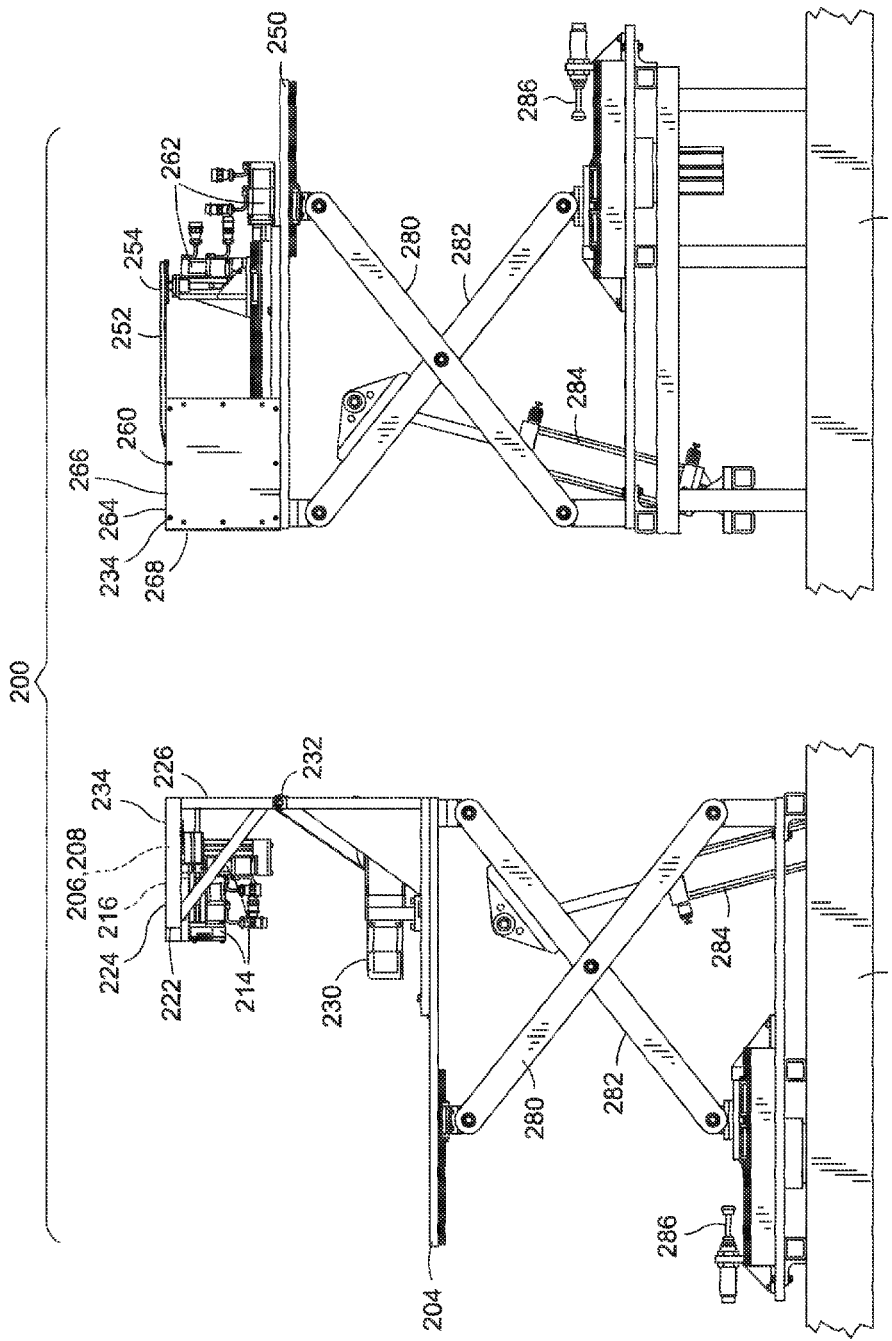

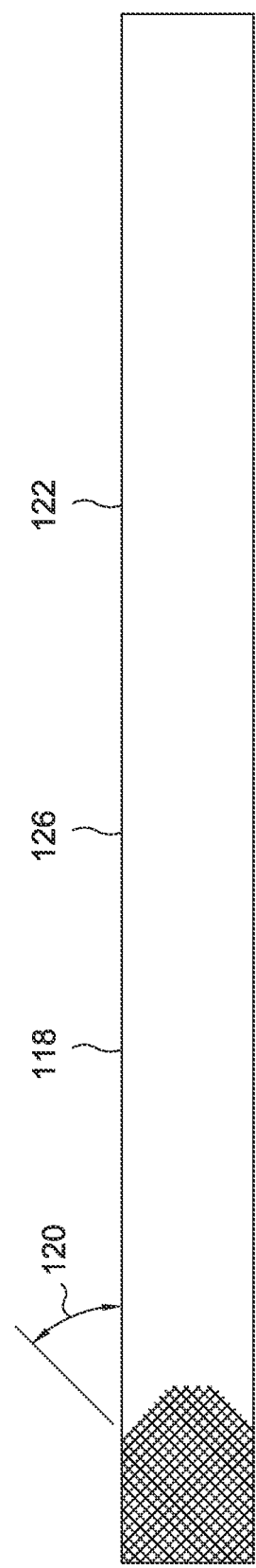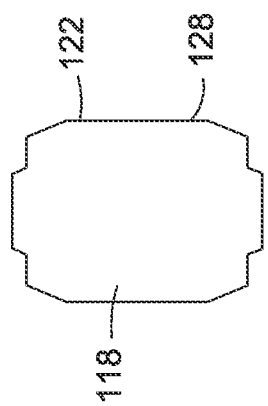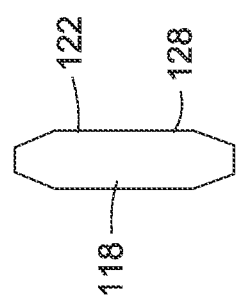

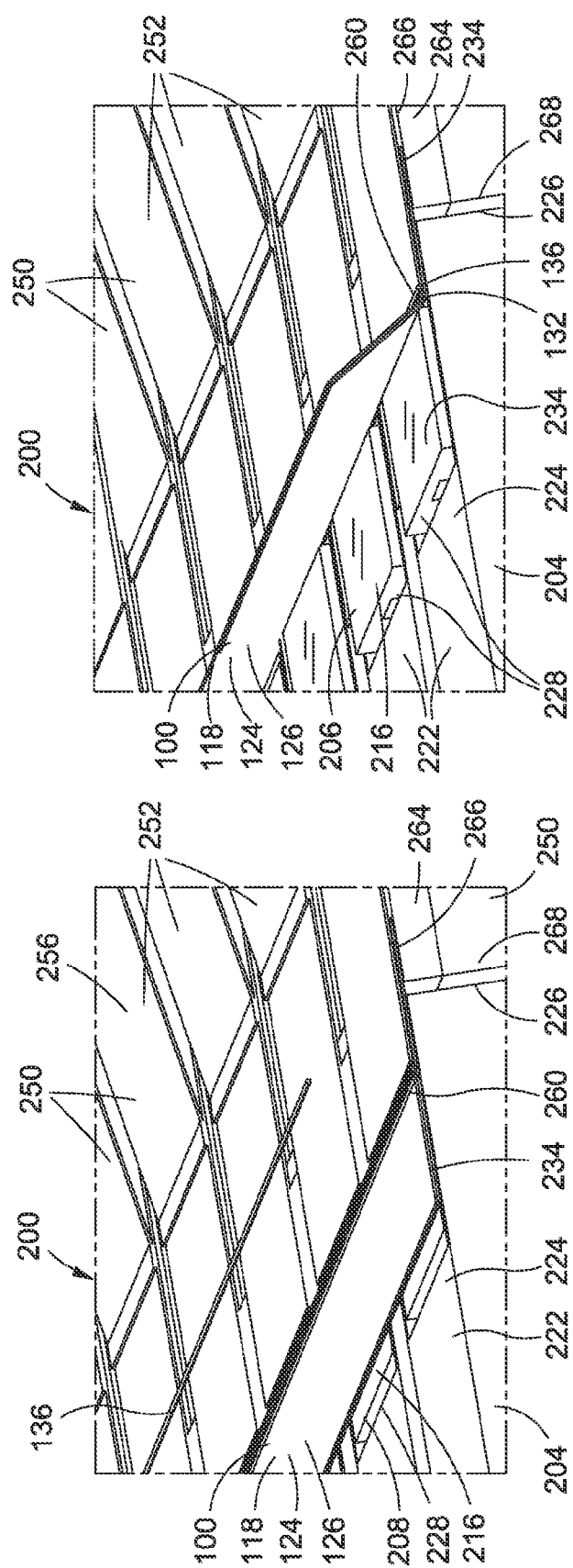

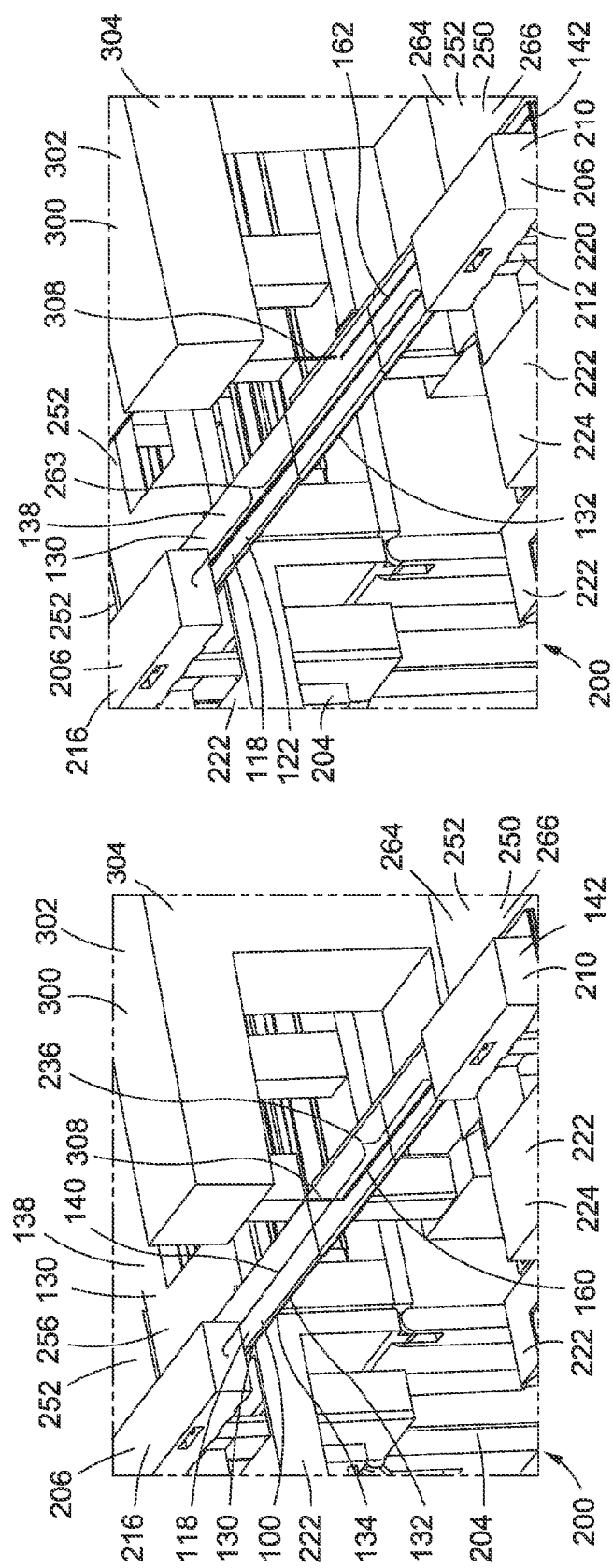

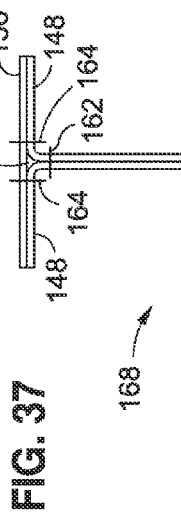
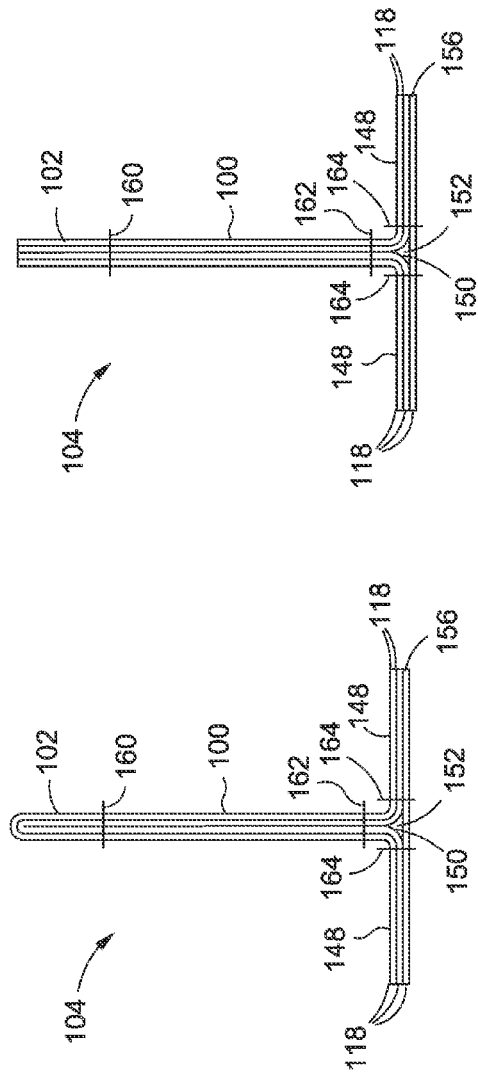
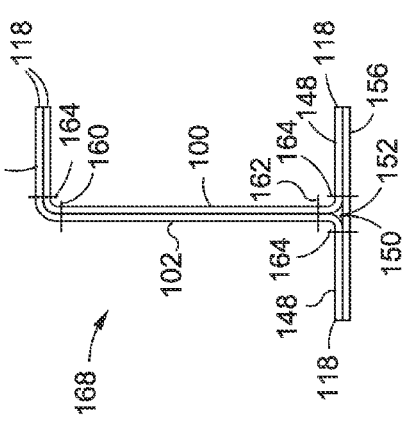

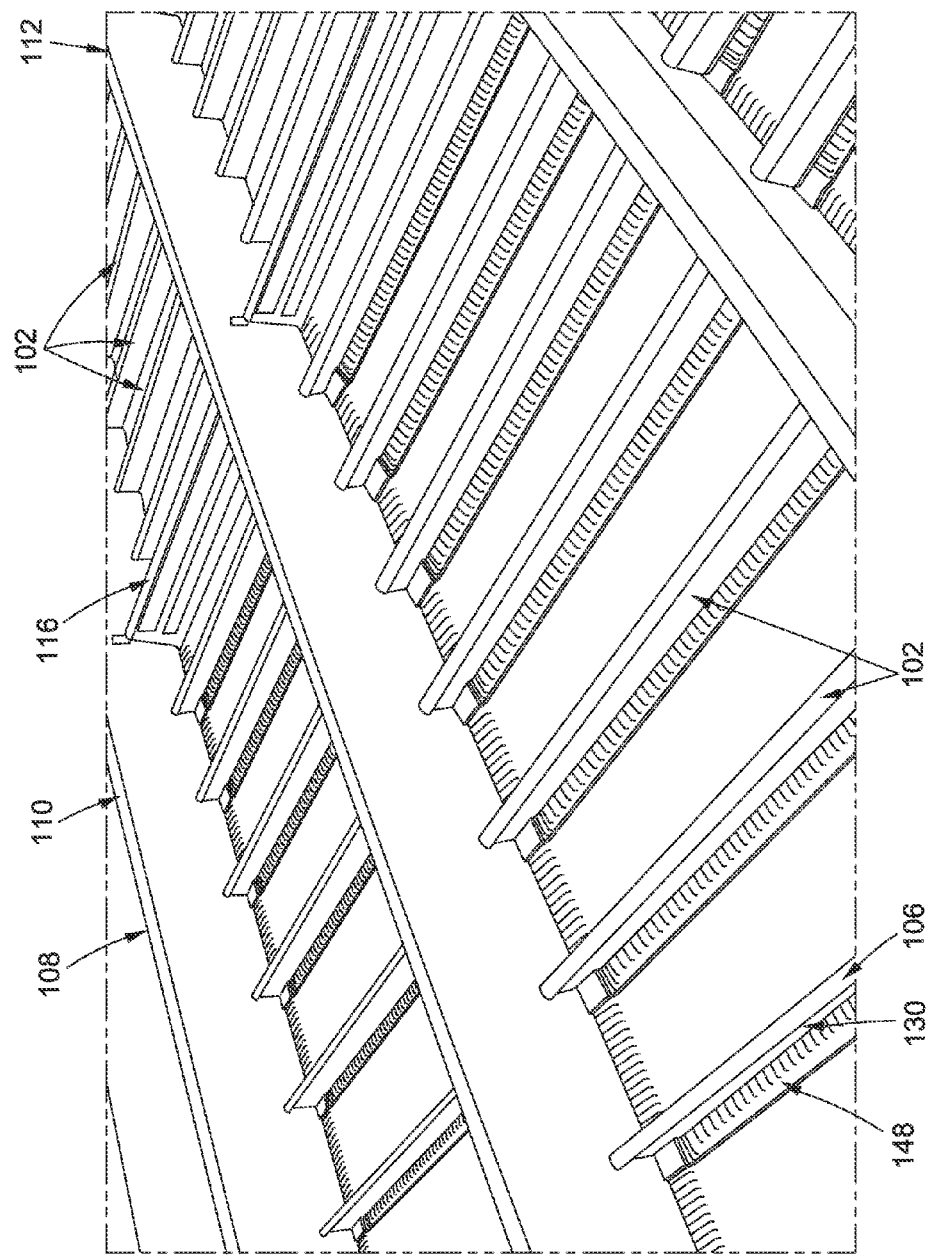

SYSTEM AND METHOD FOR PRODUCING A THREE-DIMENSIONAL DRY FIBER PREFORM

FIELD

The present disclosure relates generally to composites manufacturing and, more particularly, to the production of dry fiber preforms for composite structures.

BACKGROUND

Composites are used in a wide variety of applications. For example, in aircraft construction, composites are used in increasing quantities to form the fuselage, wings, and tail section of conventional tube-and-wing aircraft. Composites may also be used in hybrid wing/body aircraft wherein the fuselage may be blended and integrated with the wings. Composite structures may include reinforcing elements to increase the overall strength and stiffness of the composite structure. For example, a composite panel may include a number of composite stiffeners such as frames and stringers that may be coupled to a composite skin member to increase the overall strength and stiffness of the composite panel. In one method of fabricating composite panels, a plurality of three-dimensional stringers may be formed as preforms of dry fabric material. The stringer preforms may be assembled to a relatively flat or curved skin preform. The skin and stringer preform assembly may be infused with resin and allowed to cure to form a final composite panel which may be used to form an airframe of an aircraft.

Conventional methods for forming three-dimensional stringer preforms include multiple hand operations to assemble, fold, and stitch the dry fabric. For example, conventional methods for forming stringer preforms require manually laying up or stacking individual pieces or plies of dry fabric into a ply stack. The method may additionally include manually positioning fabric ply doublers at one or more locations along a length of the ply stack. The ply stack may then be hand-folded to form a web which may be tack-stitched by hand and loaded into a stitching jig for inserting one or more web seams. Following the stitching of the web, the partially-formed stringer may be debulked, and manually-positioned in a preform assembly jig. After mounting in the assembly jig, the stringer flanges may be hand-formed, radius fillers may be installed, and tear straps may be manually applied over the flanges.

Unfortunately, the above-described preform forming process relies extensively on skilled touch labor which presents several drawbacks. For example, the large number of operations required for manually laying up, folding, and tack-stitching the dry fabric results in a lengthy cycle time for producing each stringer preform. For certain composite structures, a large quantity of stringer preforms may significantly add to the production schedule for the composite structure. Variations in stringer cross-section, variations in flange width, and localized ply doubler buildups along the stringer length add to the complexity and time required to fabricate each stringer preform. In addition, the high degree of accuracy required for forming each stringer preform may result in significant dimensional variation between stringer preforms and an excessively-high rejection rate requiring rework that may add to production costs.

As can be seen, there exists a need in the art for a system and method of forming a stringer preform that requires a minimal amount of recurring skilled touch labor. In addition, there exists a need in the art for a system and method of forming a stringer preform in a reduced amount of time and at reduced cost. Furthermore, there exists a need in the art for a system and method of forming stringer preforms with a high degree of accuracy and with minimal dimensional variation between stringer preforms.

SUMMARY

The above-noted needs associated with forming three-dimensional dry fiber preforms are specifically addressed and alleviated by the present disclosure which provides a preform forming machine. The preform forming machine may include a forming block assembly and a clamping plate assembly. The forming block assembly may have a forming table and a forming block and may be positionable in a series of forming block assemblies. The clamping plate assembly may have a clamping table and a clamping plate and may be positionable in a series of clamping plate assemblies arranged in opposing relation to the series of forming block assemblies. Each forming block may be configured to fold a ply stack over onto itself to form a web of a preform. Each clamping plate may be configured to clamp the ply stack to the forming table during the folding of the ply stack.

In a further embodiment, disclosed is a preform forming machine having series of forming block assemblies and a series of clamping plate assemblies. The series of forming block assemblies may be arranged in side-by-side relation to one another. Likewise, the series of clamping plate assemblies may be arranged in side-by-side relation to one another and in opposing relation to the series of forming block assemblies. Each one of the forming block assemblies may have a forming table and a forming block. Each one of the clamping plate assemblies may have a clamping table and a clamping plate. Each forming block may be configured to fold a ply stack over onto itself to form a web of a preform. Each clamping plate may be configured to clamp the ply stack to the forming table during the folding of the ply stack.

Also disclosed is a method of producing a three-dimensional dry fiber preform. The method may include laying up a ply stack of fabric plies on a layup surface defined by a series of forming block assemblies and a series of clamping plate assemblies positioned in opposing relation to the series of forming block assemblies. The method may further include clamping the ply stack to the layup surface using the clamping plates, and folding the ply stack about a web fold line using the forming blocks to form overlapping layers of a web of a preform.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is a side view of a forming block assembly of the preform forming machine unit of FIG. 1;

FIG. 4 is a side view of a clamping plate assembly of the preform forming machine unit of FIG. 1;

FIG. 5 is a plan view a flat pattern of a base ply formed of dry fiber ply material and which may be laid up in a ply stack on the preform forming machine to fabricate a preform;

FIG. 6 is a plan view of an embodiment of a flat pattern of a doubler formed of dry fiber ply material and which may be included with one or more base plies in the ply stack;

FIG. 7 is a plan view of a further embodiment of a flat pattern of a doubler formed of dry fiber ply material and which may be included with one or more base plies in the ply stack;

Figure 12:
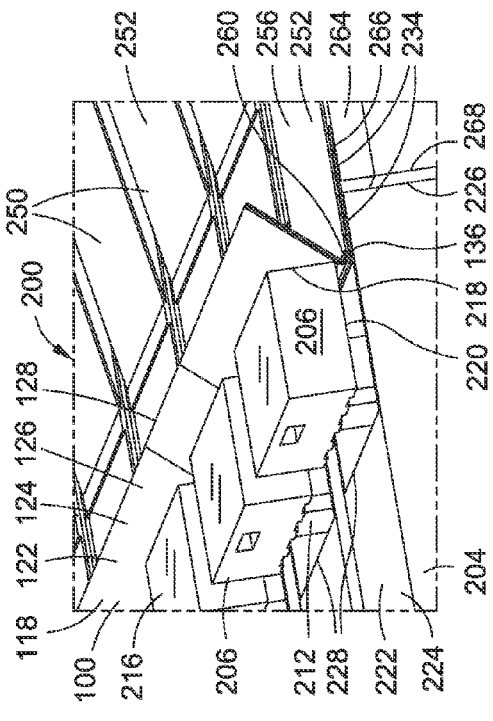
Figure 13:
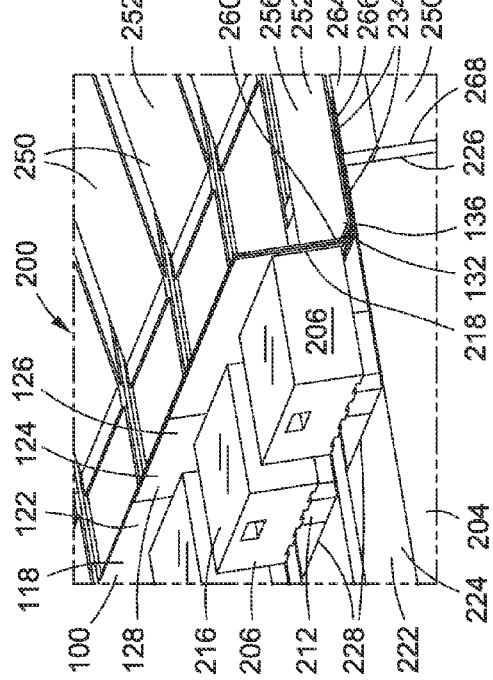
Figure 14:
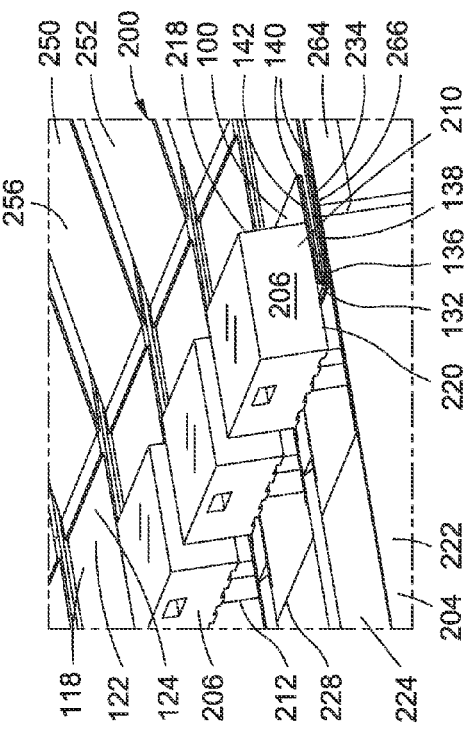
Figure 15:
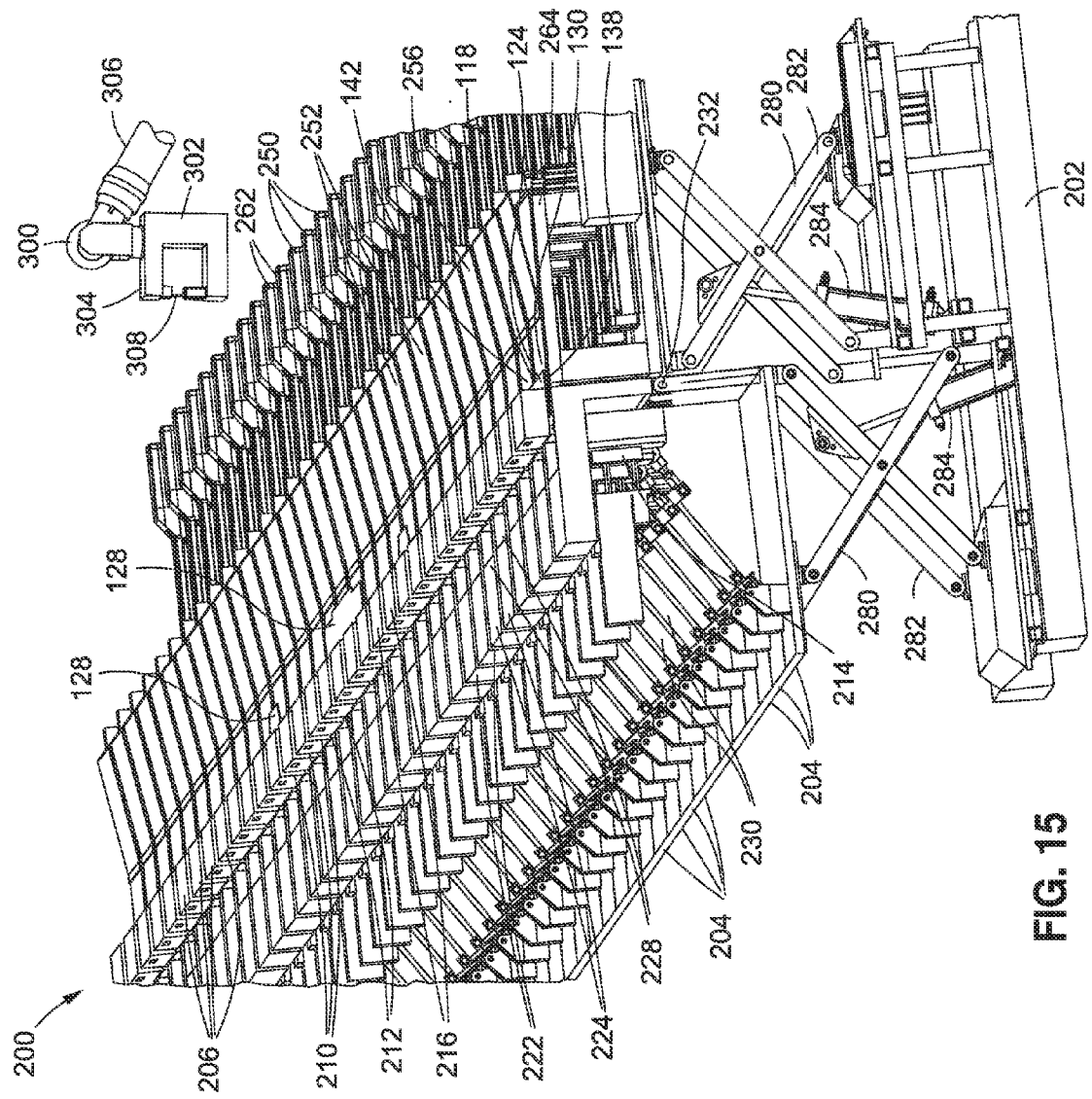
Figure 18:
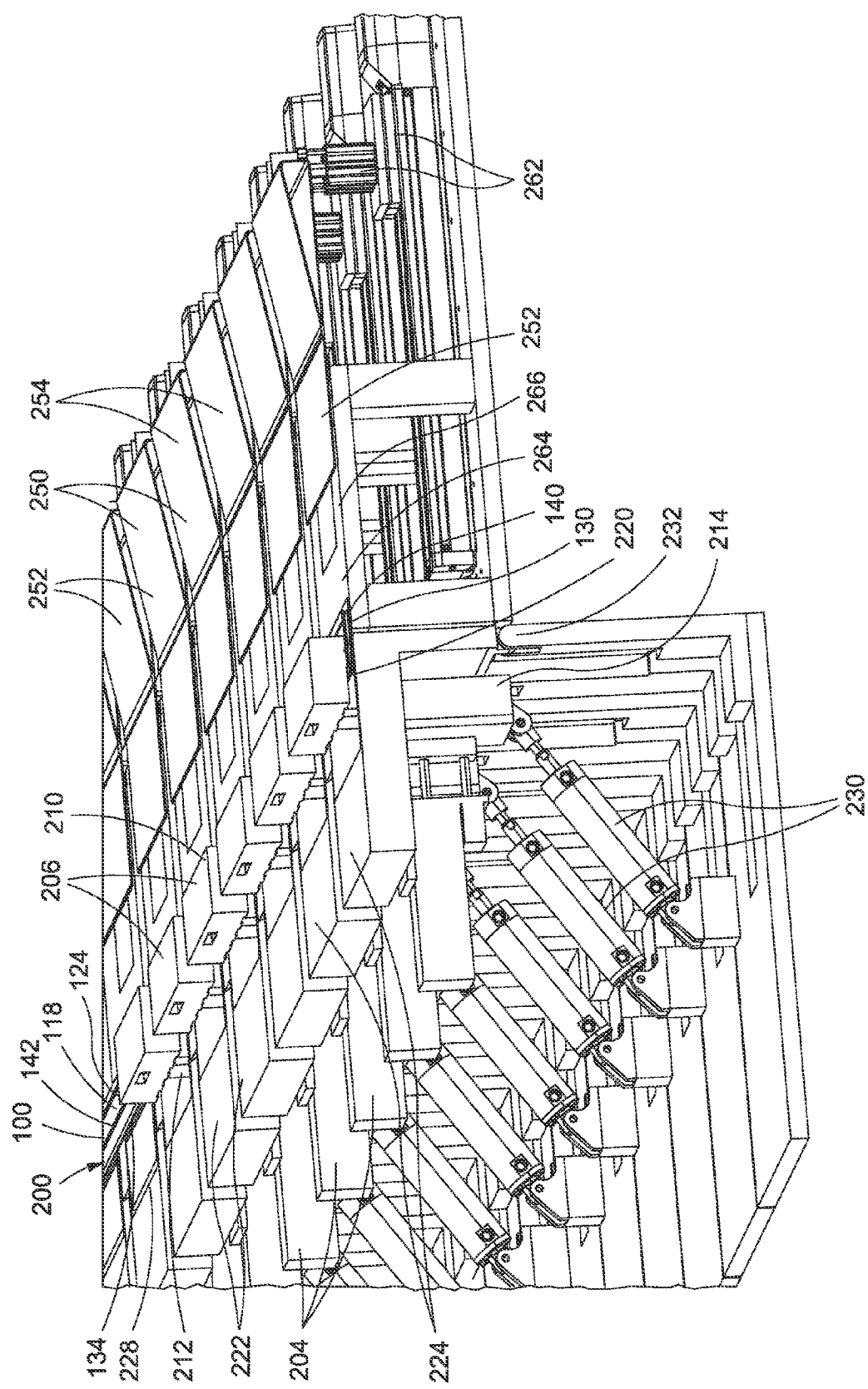
Figure 19:
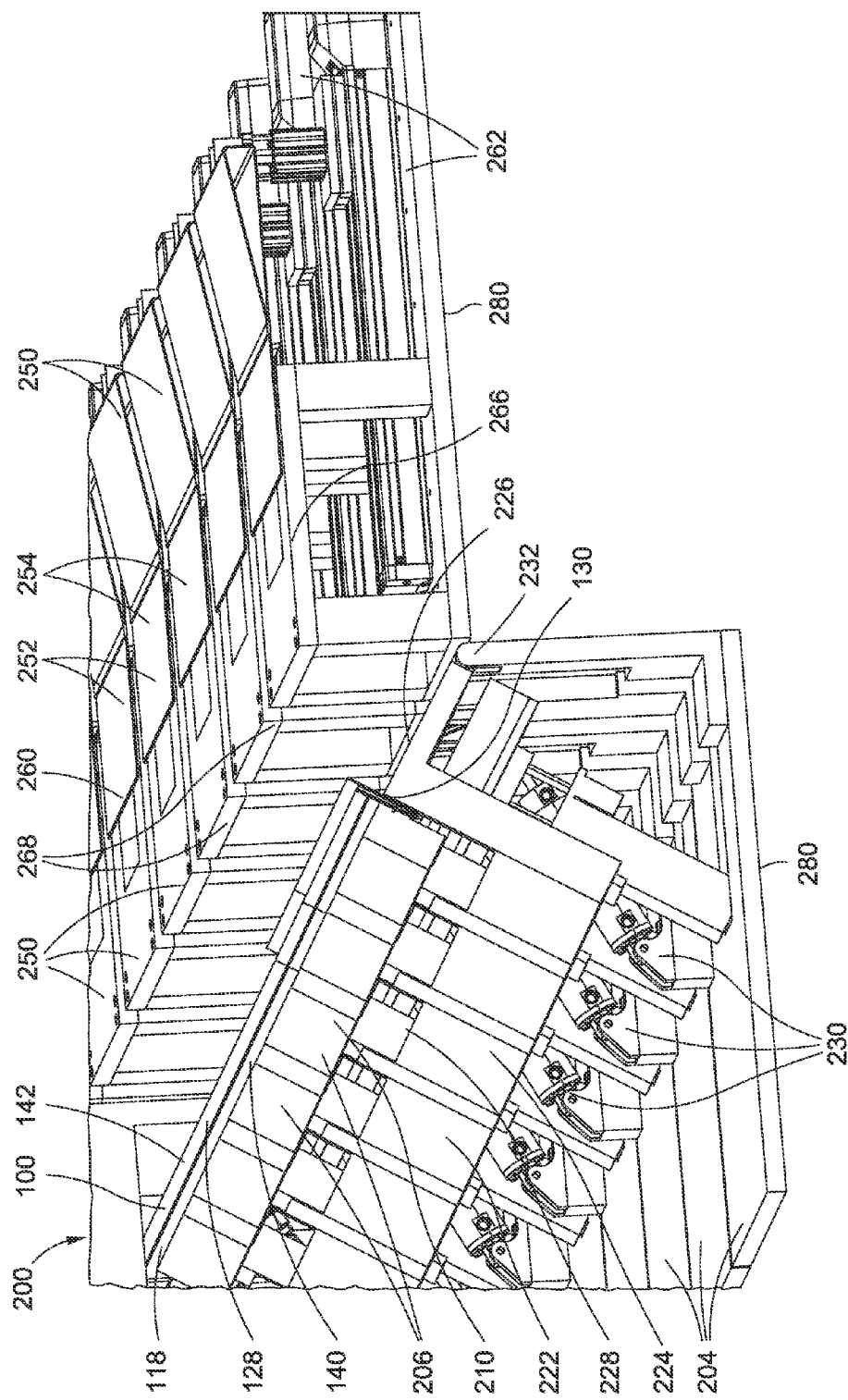
Figure 20:
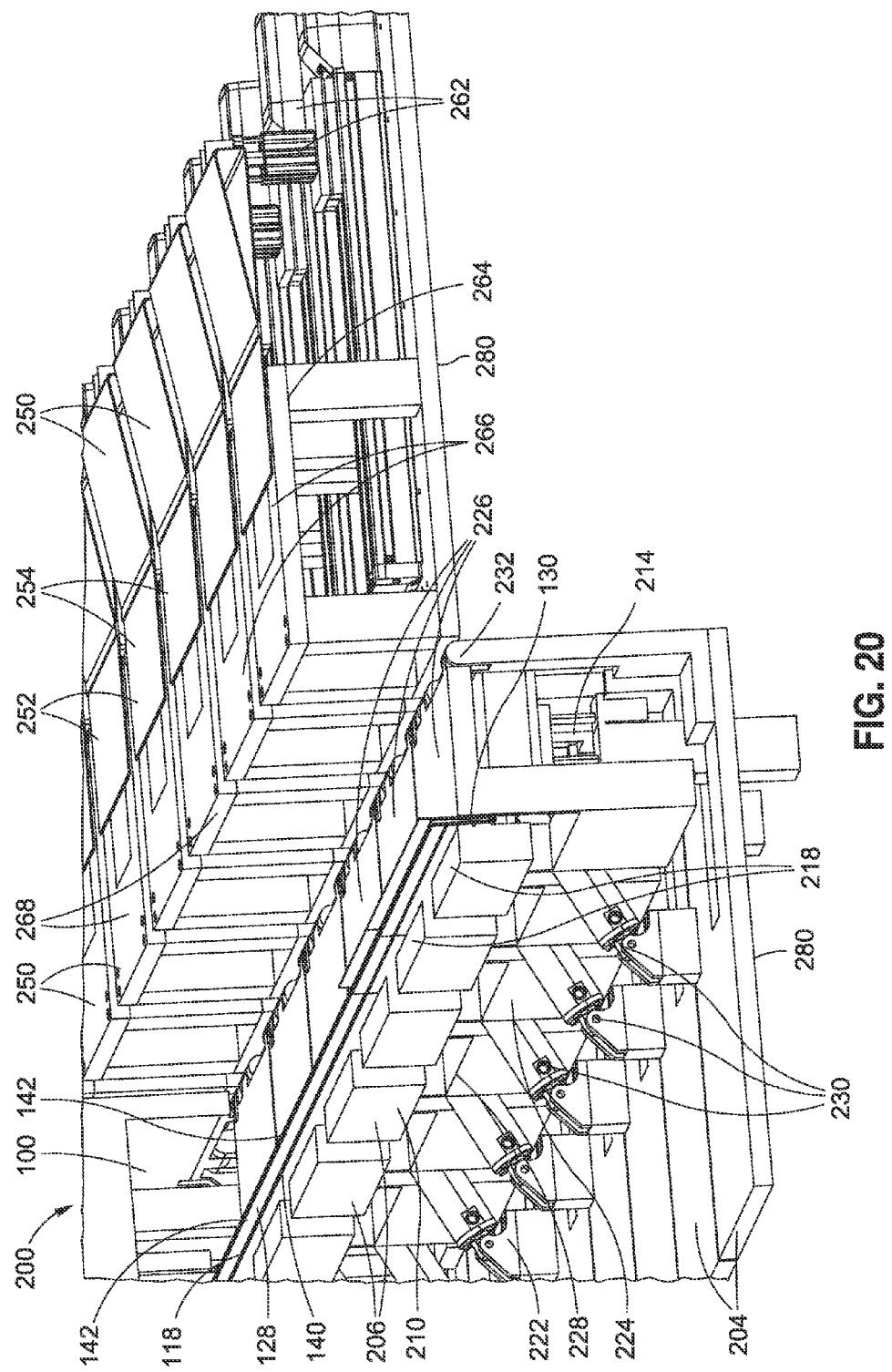
Figure 21:
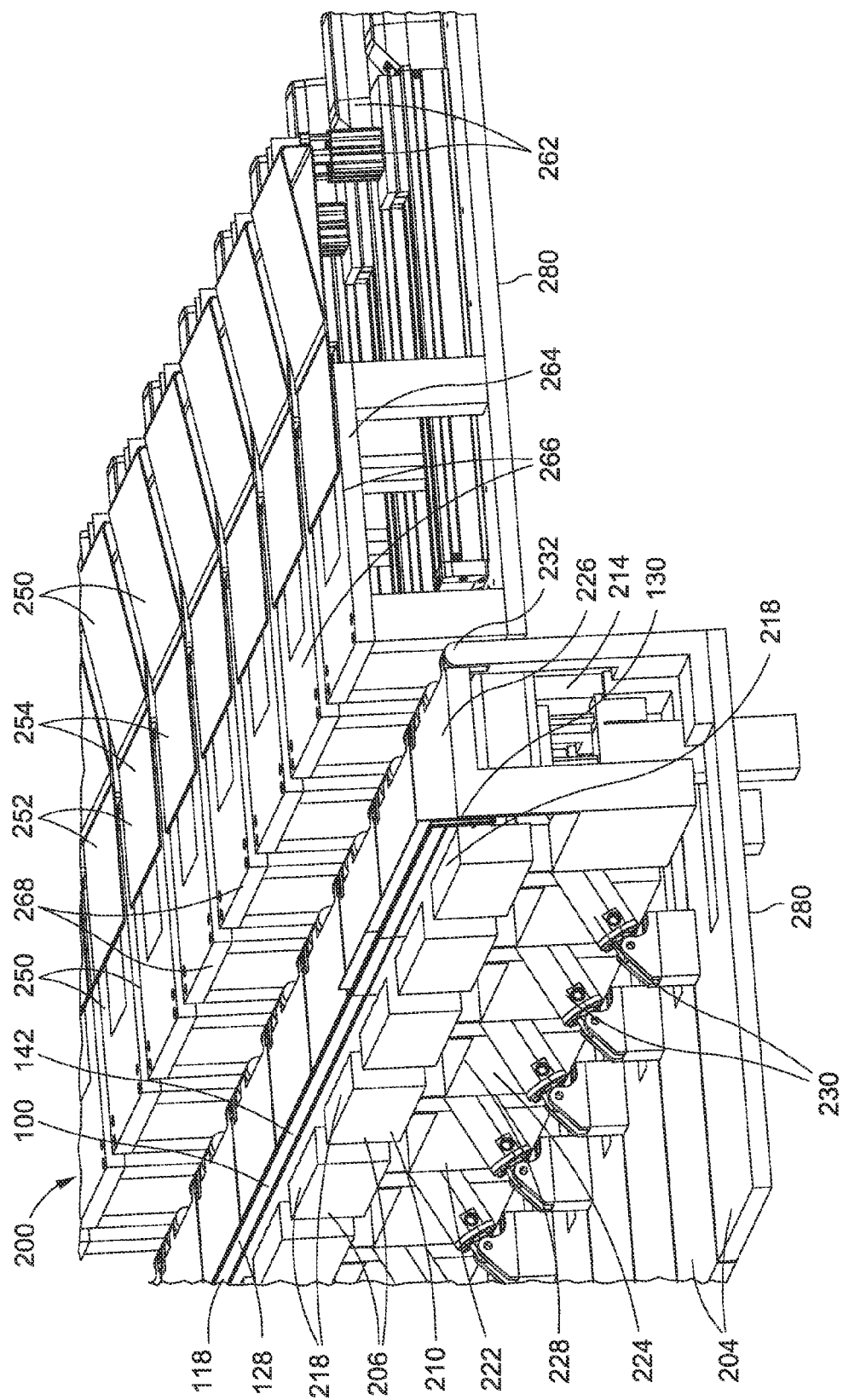
Figure 22:
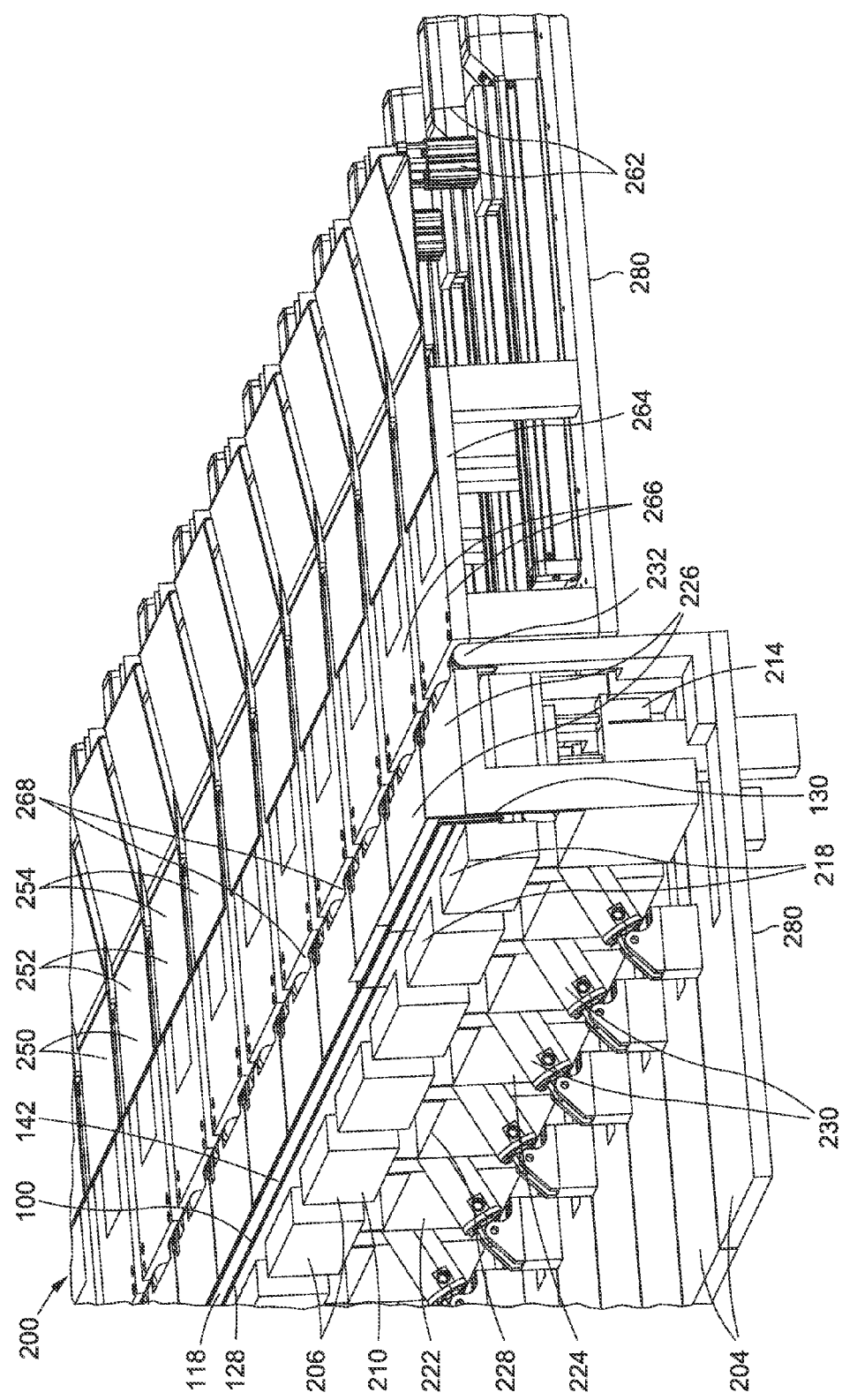
Figure 23:
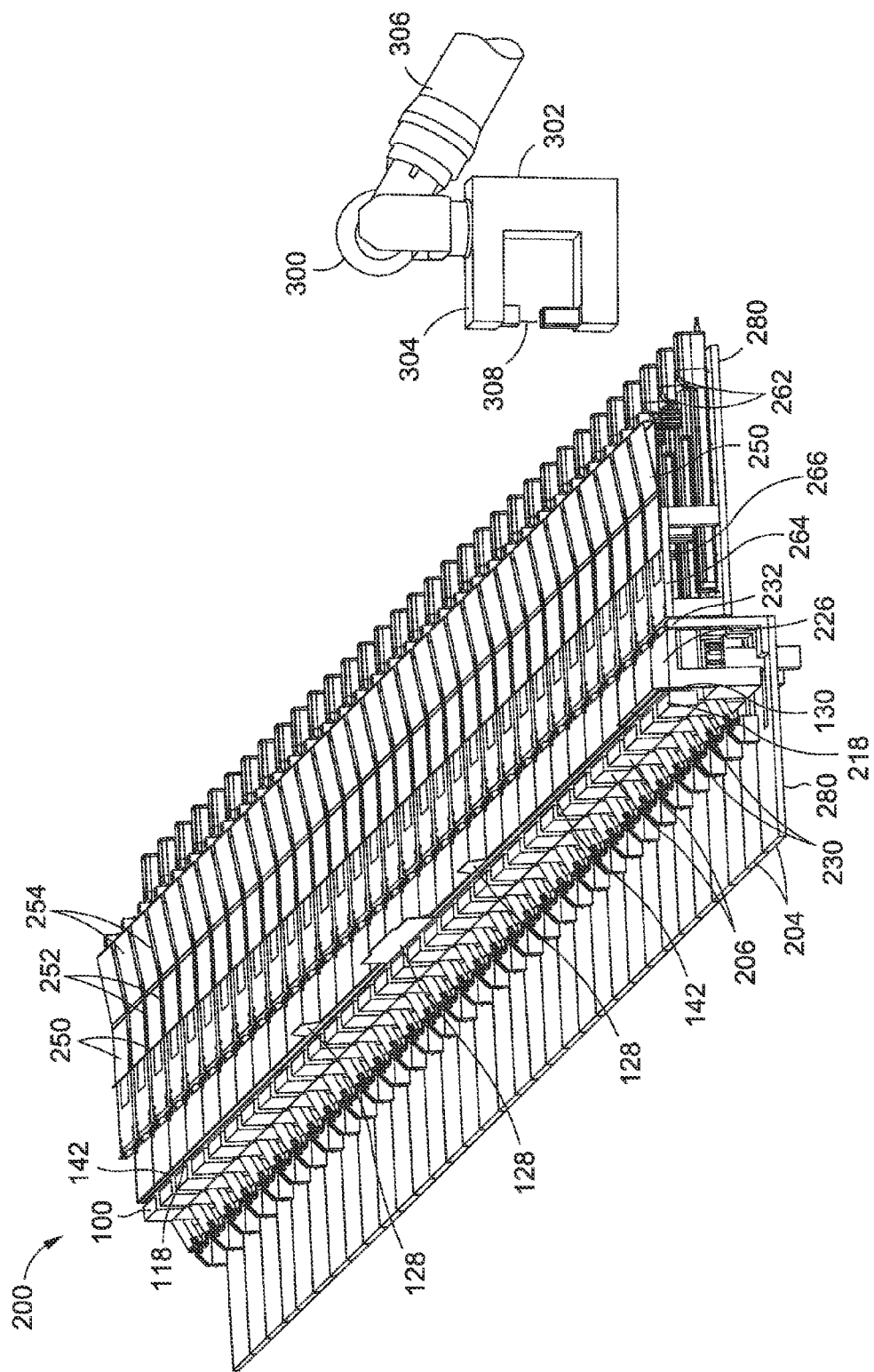
Figure 24:
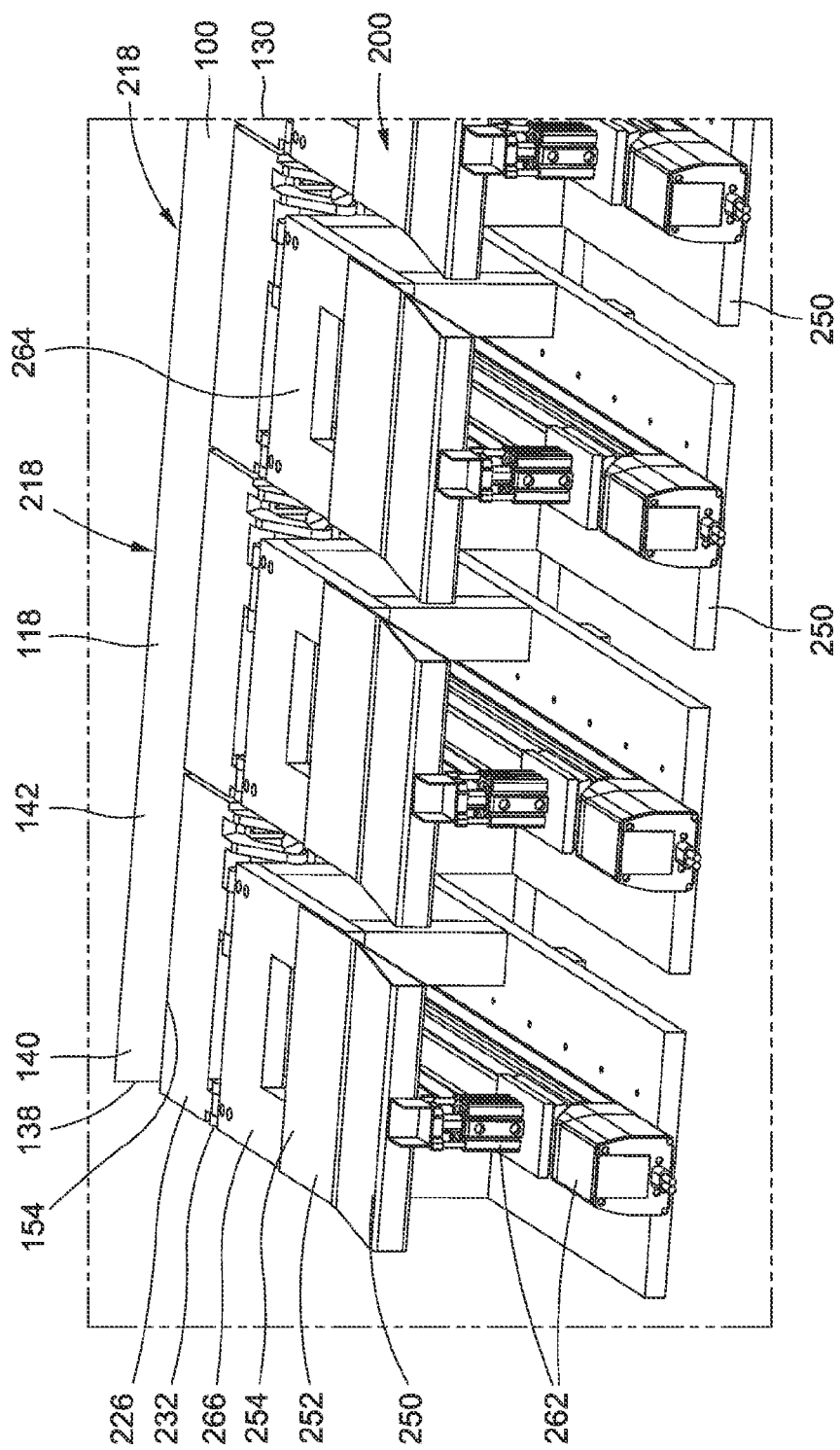
Figure 25:
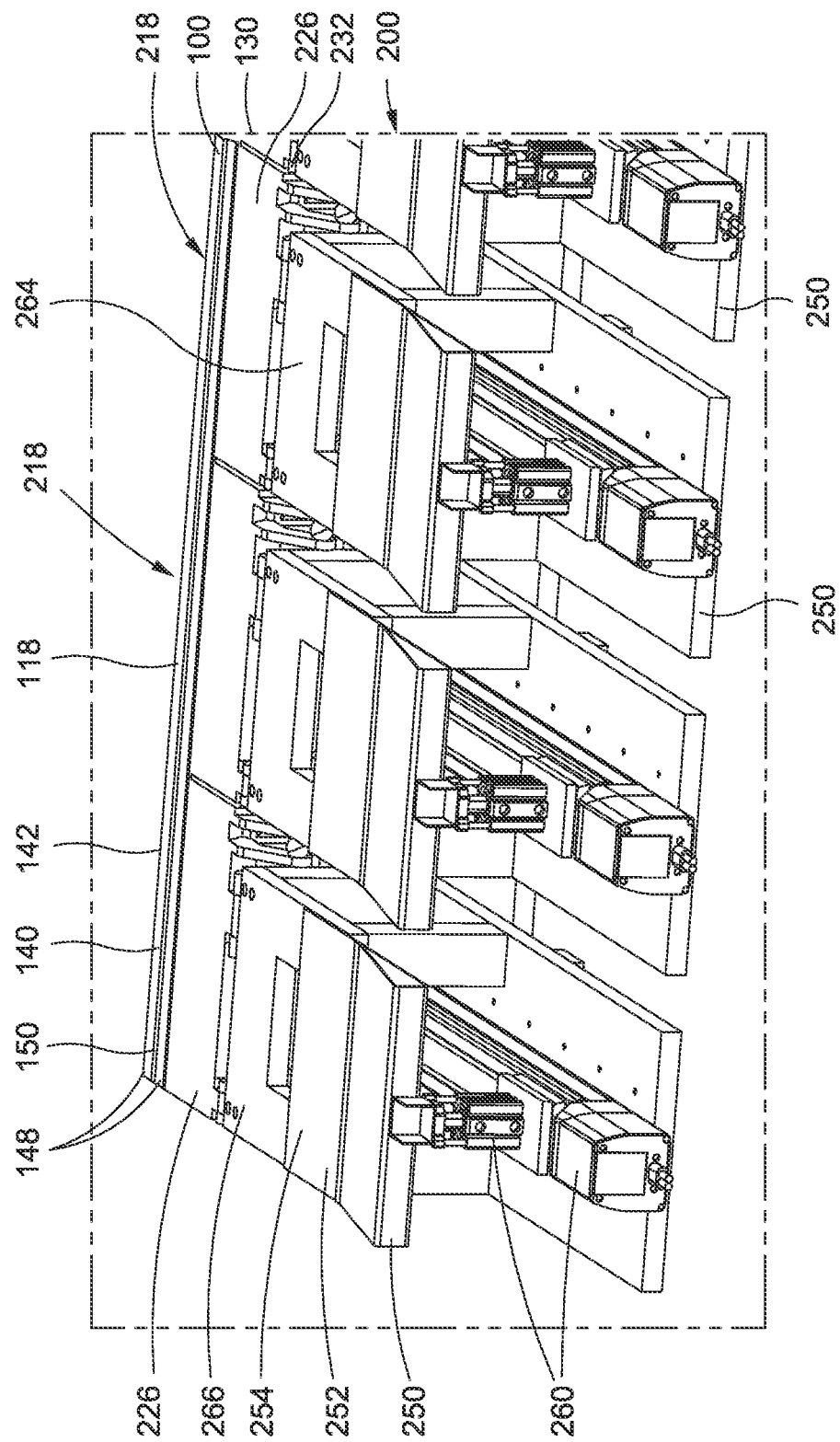
Figure 26:
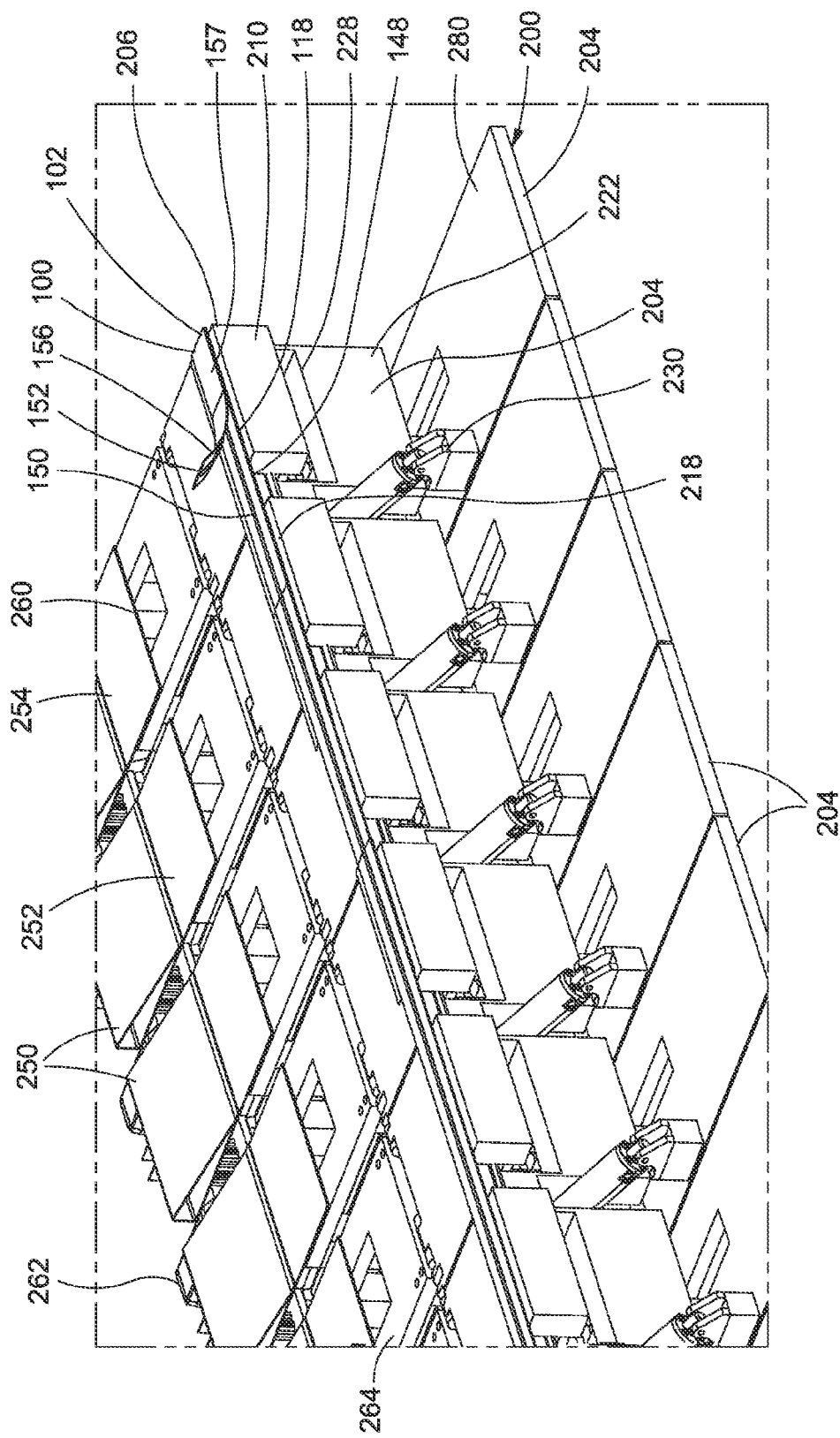
Figure 27:
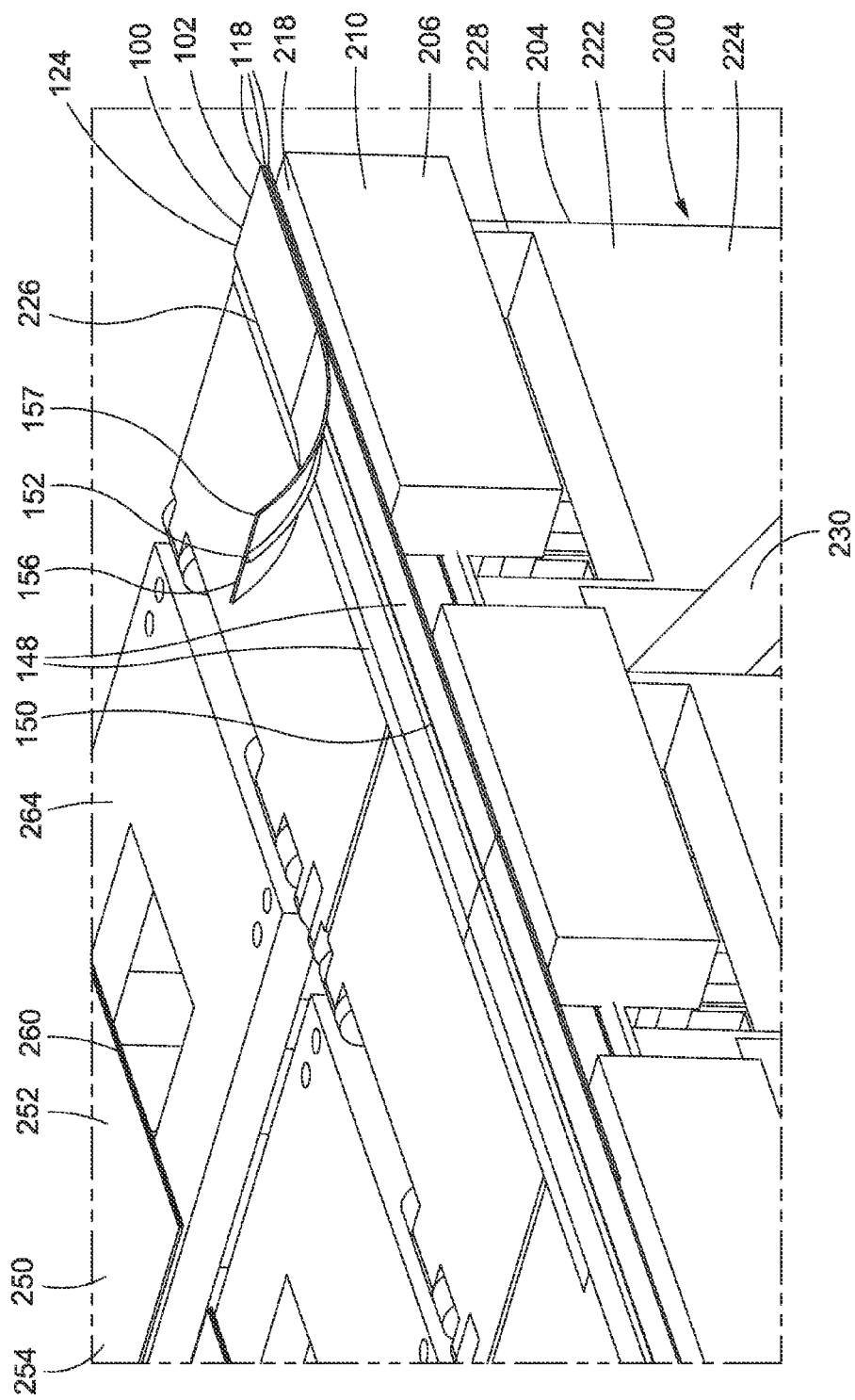
Figure 28:
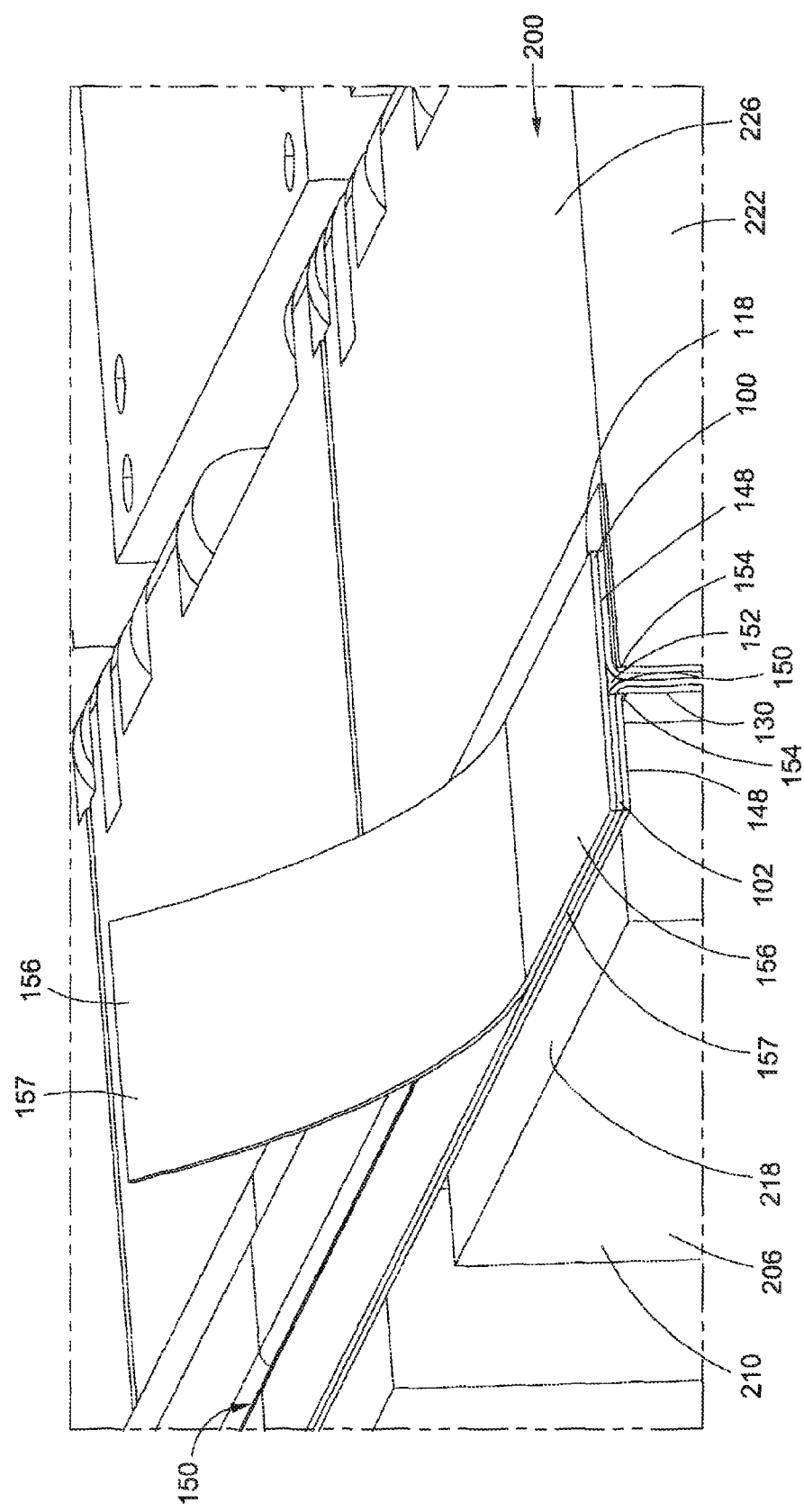
Figure 29:
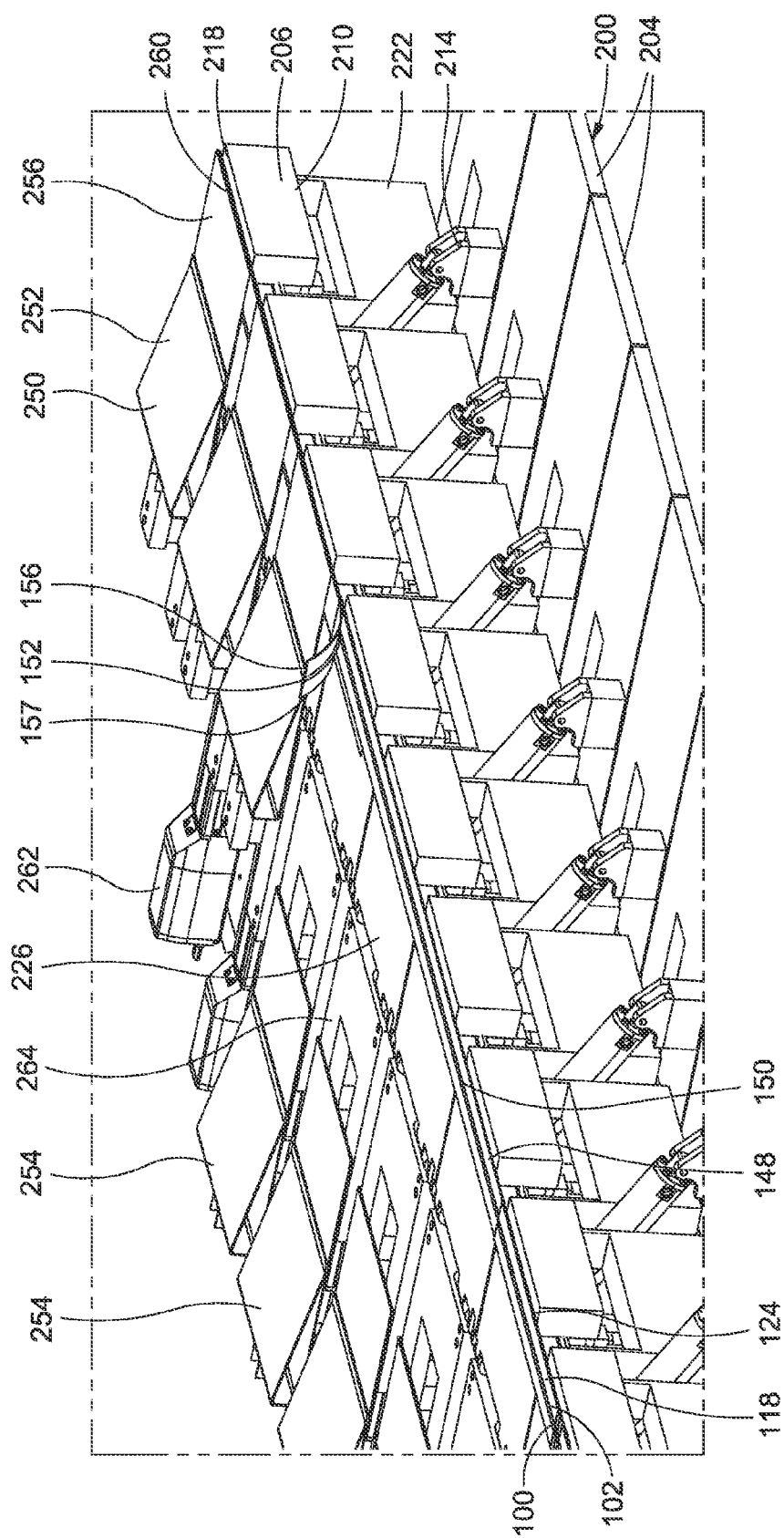
Figure 30:
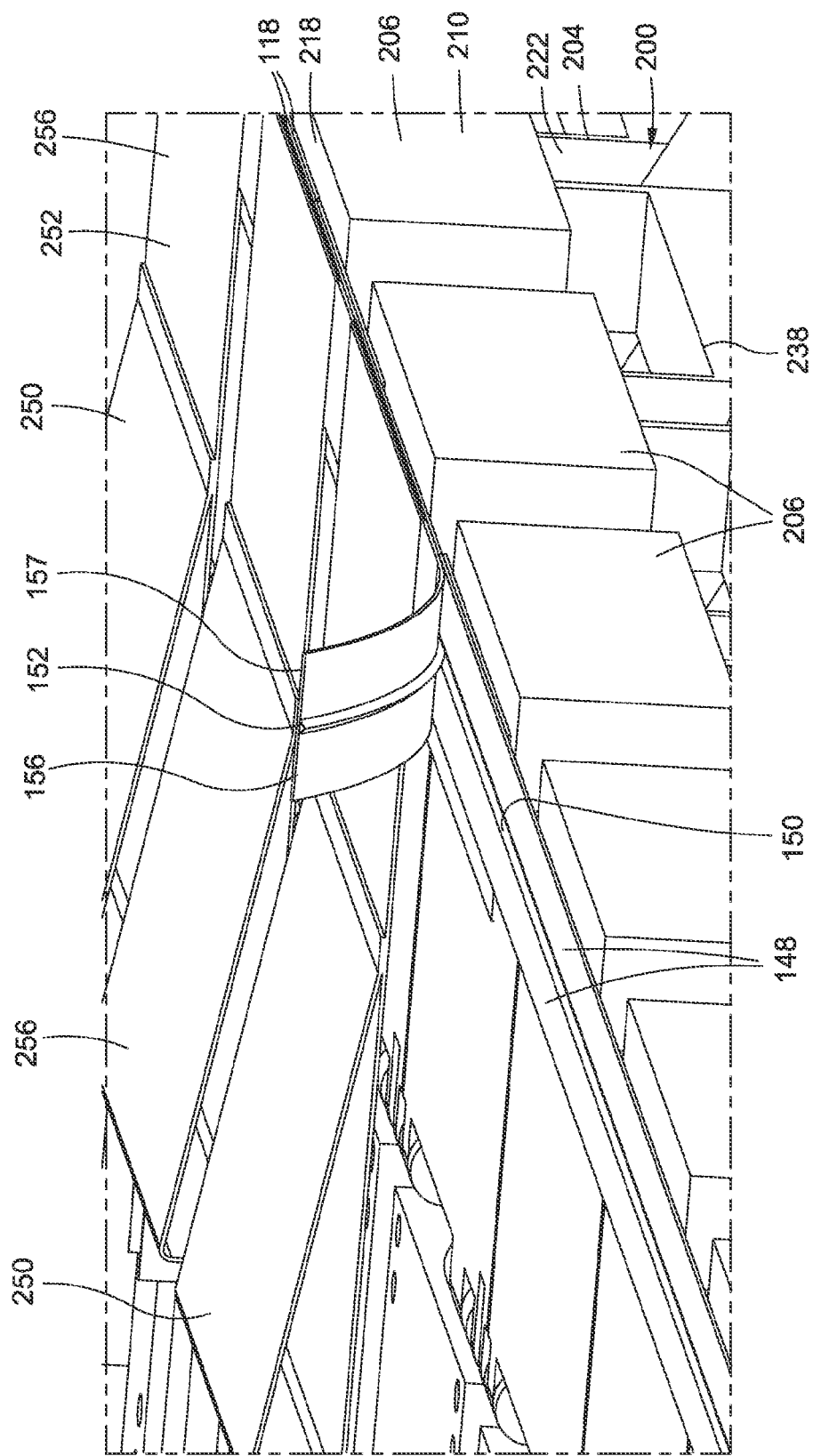
Figure 31:
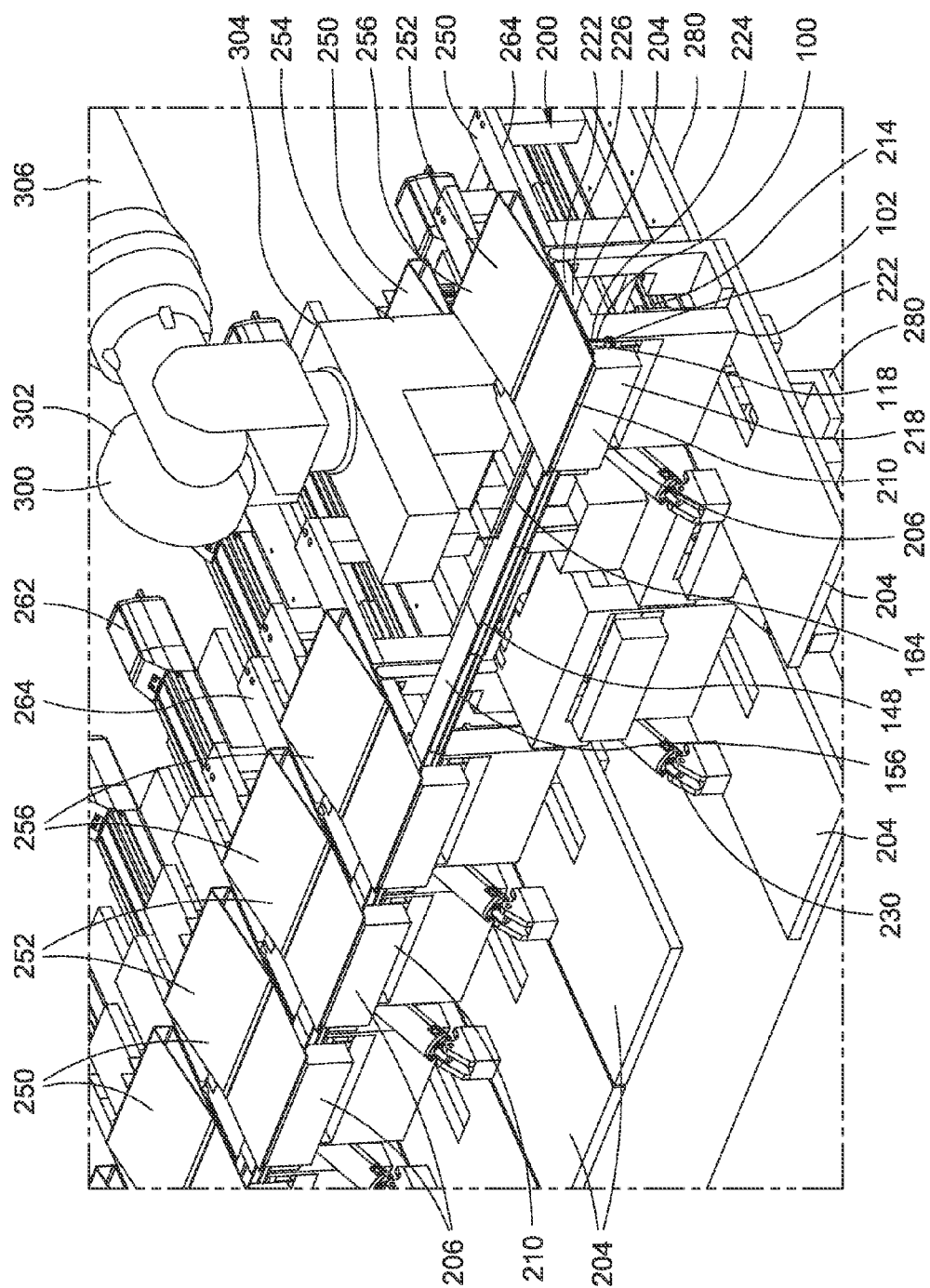
Figure 32:
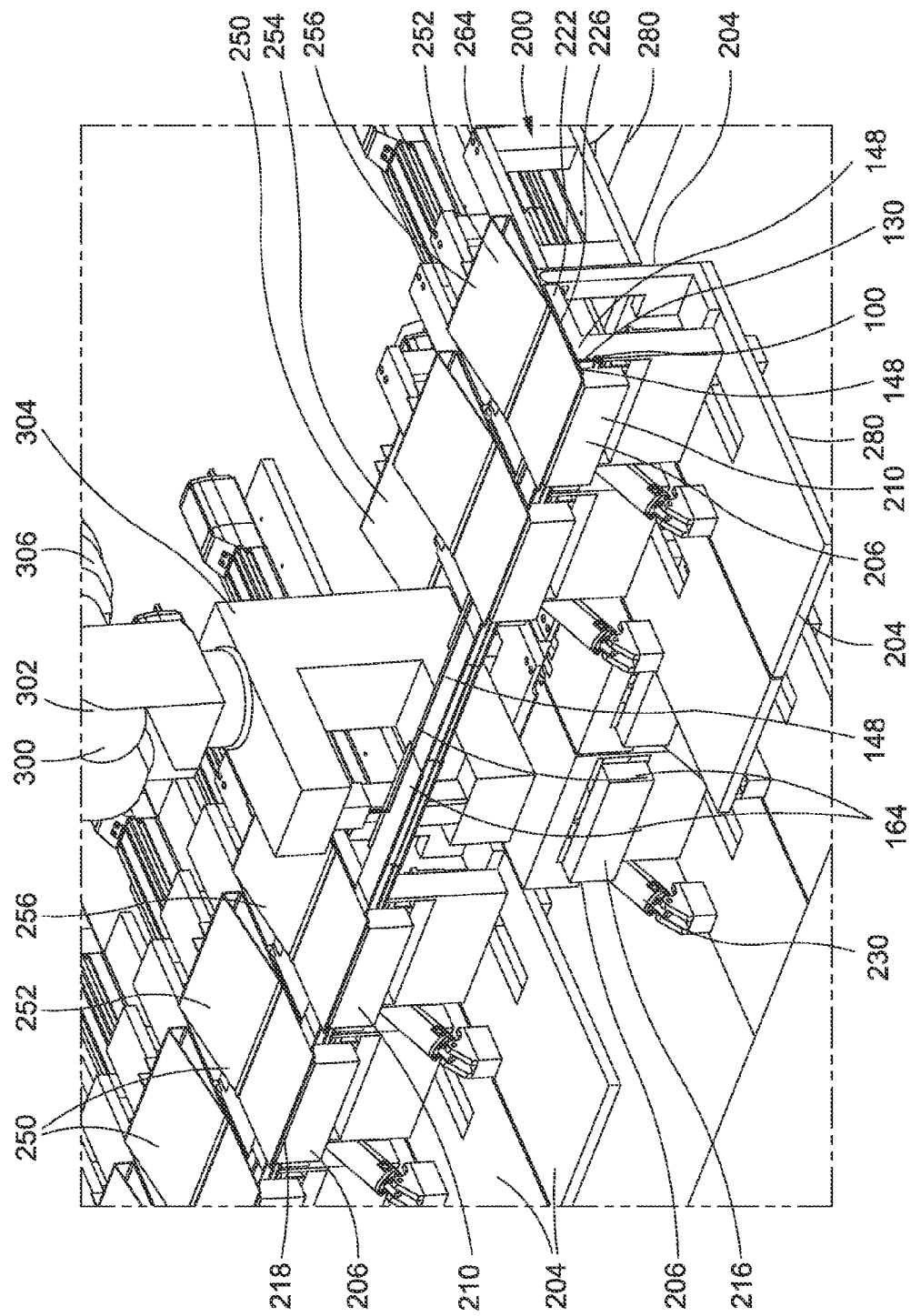
Figure 34:
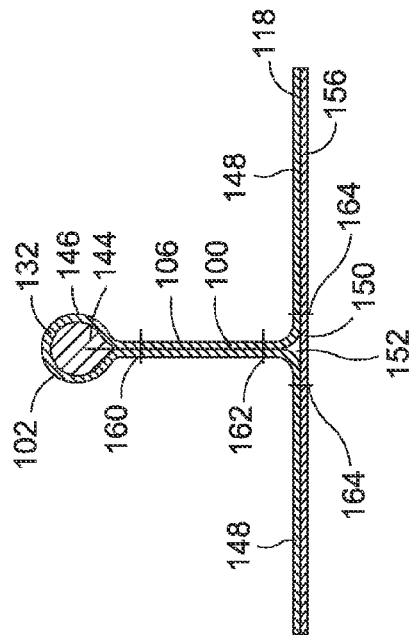
Figure 33:
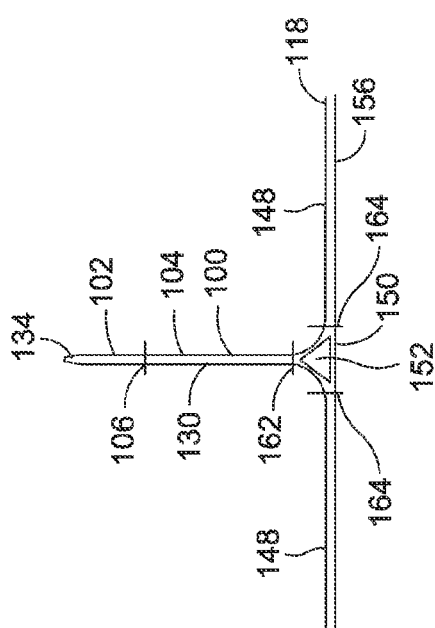
Figure 35:
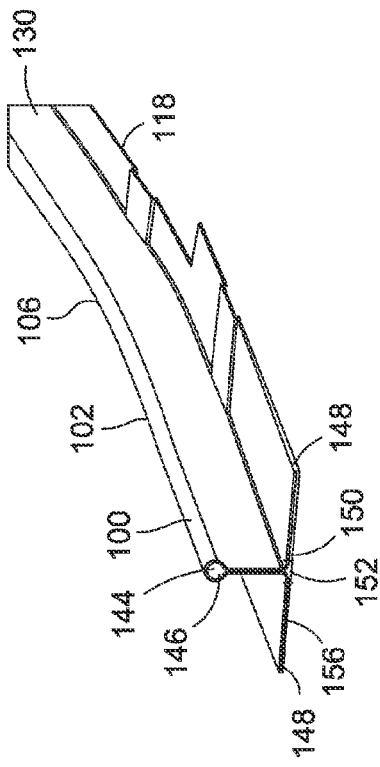
Figure 41:
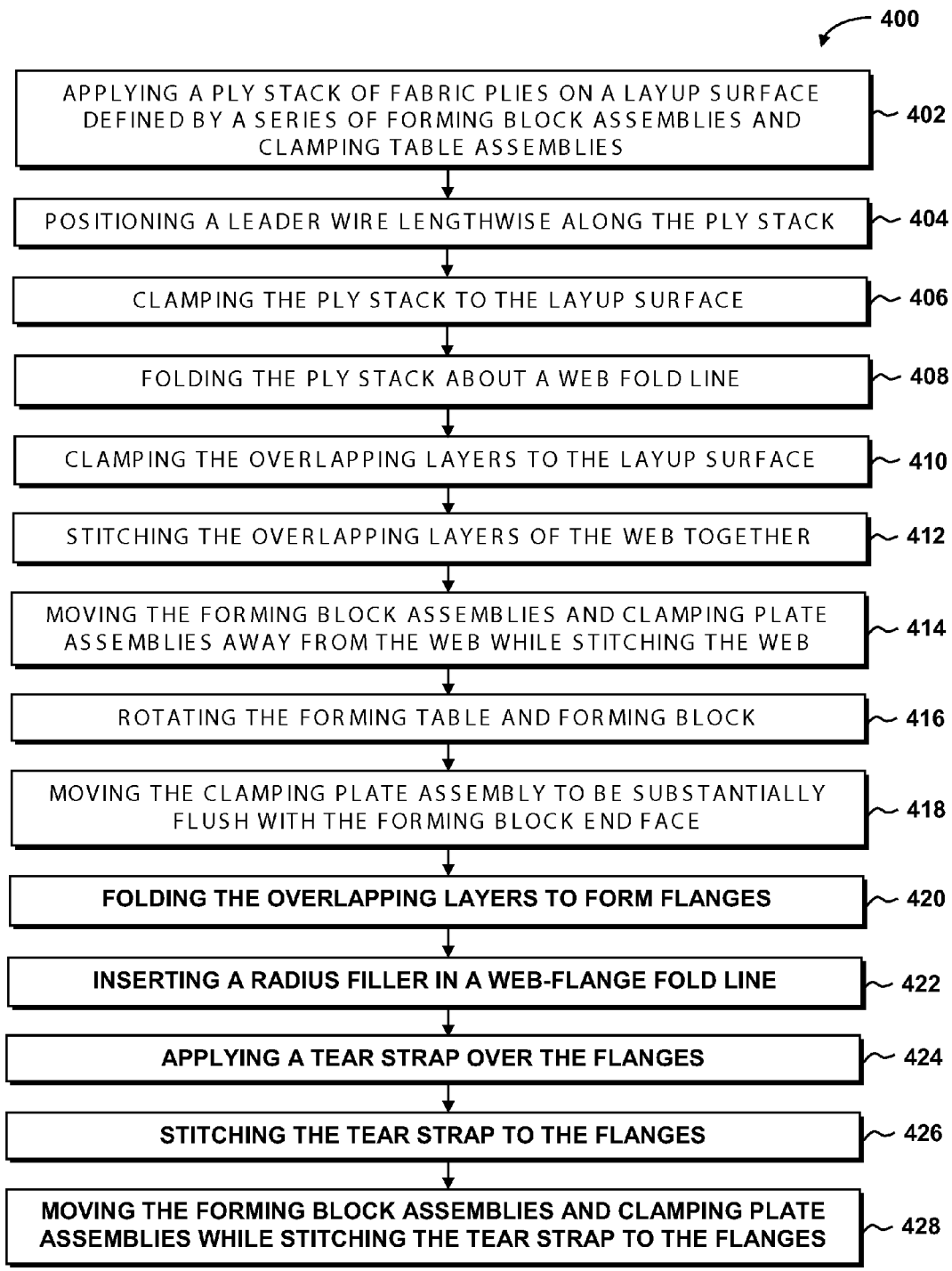
Figure 42:
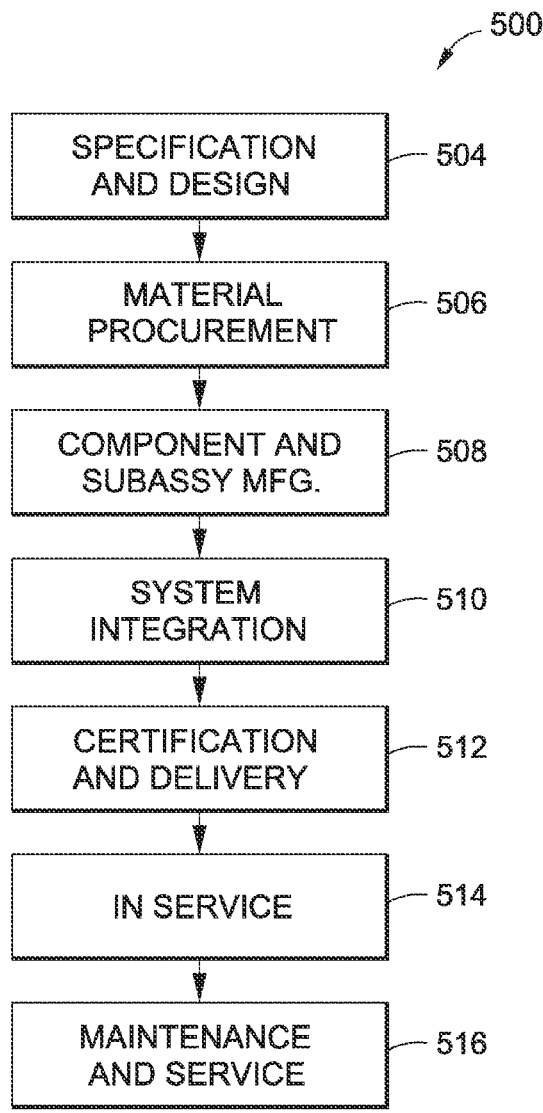
Figure 43:
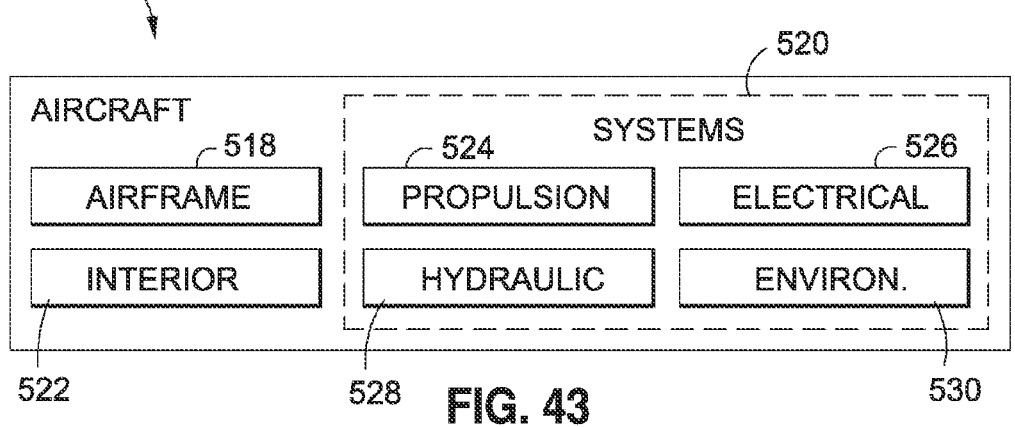

Figure nine is an illustration of the preform forming machine wherein the ply stack is clamped in position by a plurality of clamping plates of the clamping plate assemblies;

FIG. 10 is an illustration of a leader wire positioned on the ply stack to define a web fold line along which the ply stack may be folded;

FIG. 11 is an illustration of a plurality of forming blocks deploying from each one of the forming block assemblies in the initial stages of folding the ply stack along the web fold line;

FIG. 12 is an illustration of the forming blocks in a further stage of folding the ply stack along the web fold line;

FIG. 13 is a further illustration of the forming blocks folding the ply stack along the web fold line;

FIG. 14 is an illustration of the forming blocks in the final stages of folding the ply stack over onto itself along the web fold line to form a web, and further illustrating the forming blocks clamping the ply stack in position;

FIG. 15 is an illustration of the preform forming machine showing a pair of independently-operated lifting mechanisms upon which the forming block assembly and the clamping plate assembly are mounted;

FIG. 16 is an illustration of the lifting mechanisms sequentially displacing the forming block assemblies and the clamping plate assemblies to create temporary machine gaps for a stitching mechanism stitching an inner web seam along the web;

FIG. 17 is an illustration of the stitching mechanism stitching an outer web seam along the web;

FIG. 18 illustrates the forming blocks clamping the stitched web in position and further illustrating the clamping plates in a retracted position;

FIG. 19 is an illustration of the initial rotation of the forming tables and forming blocks about a table rotation axis;

FIG. 20 is an illustration of the final position of the forming tables and forming blocks following rotation thereof, and further illustrating a protruding portion of the web protruding outwardly from the end faces of the forming tables and the forming blocks;

FIG. 21 is an illustration of an initial stage of the lowering of the clamping plate assemblies;

FIG. 22 is an illustration of the final stage of the lowering the clamping plate assemblies such that the clamping tables are substantially flush with the forming table end faces;

FIG. 23 is an illustration of the preform forming machine showing the protruding portion of the web protruding outwardly from the end faces of the forming tables and the forming blocks;

FIG. 24 is a further illustration of a portion of the preform forming machine showing the protruding portion of the web protruding outwardly from between the end faces of the forming tables and the forming blocks;

FIG. 25 is an illustration of the protruding portion after being folded over onto the end faces of the forming blocks and the forming tables to form a pair of flanges of the preform;

FIG. 26 is an illustration of a tear strap being initially laid up over the flanges of the preform;

FIG. 27 is an illustration of a unitary tear strap assembly comprising a tear strap and integral radius filler being simultaneously installed over the flanges of the preform;

FIG. 28 is an end view of a stringer preform showing the radius filler installed within the groove between the flanges and overlaid by the tear strap;

FIG. 29 is an illustration of several of the clamping plates clamping the tear strap over the flanges during layup of the tear strap;

FIG. 30 is an illustration of the unitary tear strap assembly being installed over the preform flanges and the sequential clamping of the clamping plates over the tear strap;

FIG. 31 is an illustration of the stitching mechanism stitching a flange seam along one of the flanges and the sequential unclamping of the clamping plates and the displacement of the forming block assemblies and the clamping plate assemblies to create a machine gap for the stitching mechanism;

FIG. 32 is a further illustration of the machine gap created for the stitching mechanism by sequentially displacing the forming block assemblies and the clamping plate assemblies during stitching of the flange seam;

FIG. 33 is a cross sectional illustration of a blade section embodiment of a stringer preform fabricated using the stringer preform forming machine;

FIG. 34 is a cross-sectional illustration of a bulb section embodiment of the stringer preform having a rod inserted within a web fold line of the web;

FIG. 35 is a perspective illustration of a portion of a bulb section stringer preform;

FIG. 36 is a cross-sectional illustration of a bulb section embodiment of the stringer preform having a rod inserted within a web fold line of the web;

FIG. 37 is a cross-sectional illustration of a further blade cross-section embodiment of the stringer preform;

FIG. 38 is a cross-sectional illustration of a J cross-section embodiment of the stringer preform;

FIG. 39 is a cross-sectional illustration of an I cross-section embodiment of the stringer preform;

FIG. 40 is a perspective illustration of an integrally stiffened composite panel containing a plurality of stringers produced in accordance with an embodiment of the present invention;

FIG. 41 is an illustration of a flow chart containing one or more operations that may be included in a method of forming a preform;

FIG. 42 is a flow diagram of an aircraft manufacturing and service methodology; and FIG. 43 is a block diagram of an aircraft.

DETAILED DESCRIPTION

Figure 1:
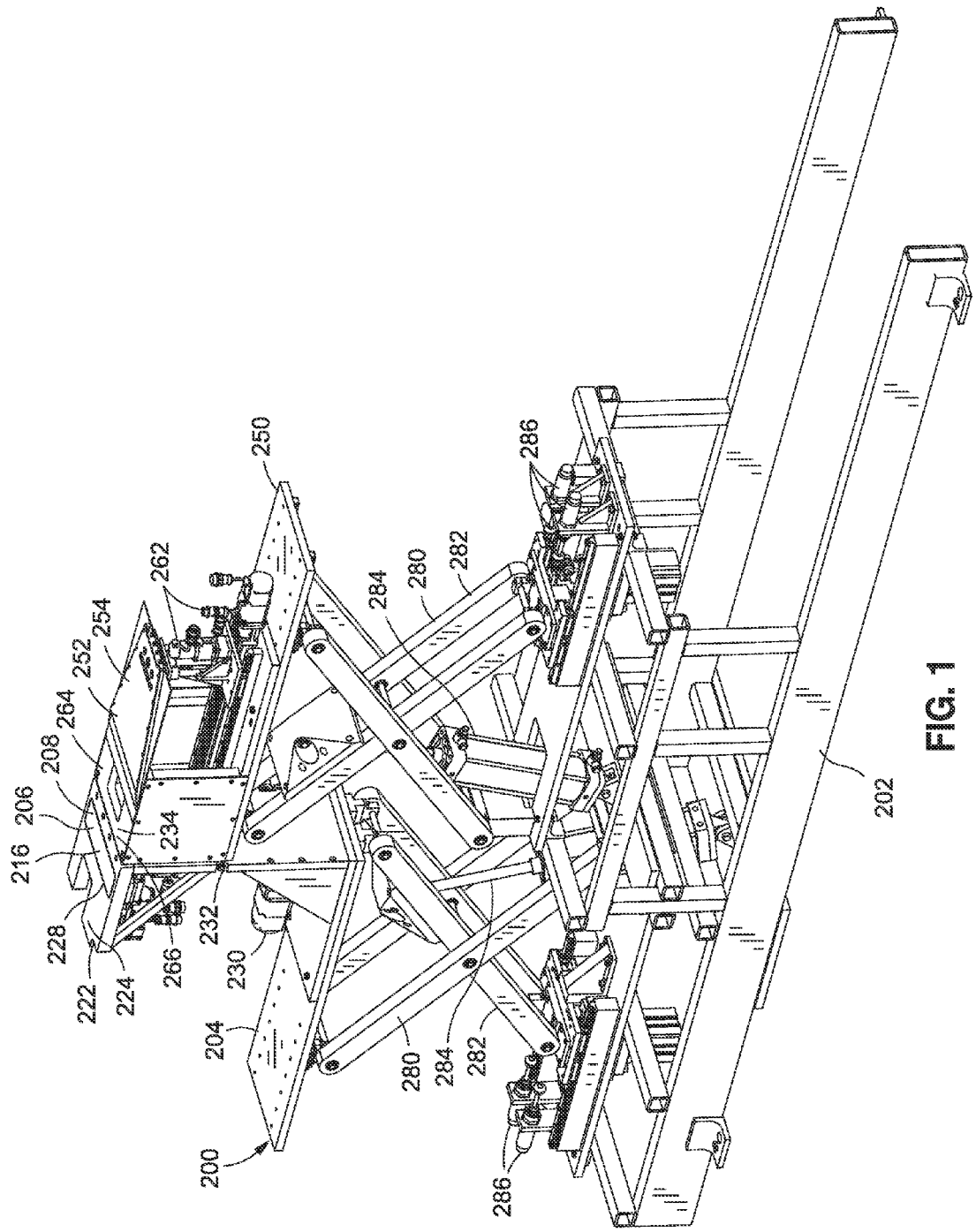
FIG. 1 is a perspective illustration of an embodiment of single unit of a preform forming machine.

Referring now to the drawings wherein the showings are for purposes of illustrating various embodiments of the present disclosure, shown in FIG. 1 is an embodiment of a single unit of a preform forming machine 200. As described in greater detail below, the preform forming machine 200 may comprise one or more of the single units arranged in a series for automated production of a continuous three-dimensional dry fiber preform 100 (FIG. 35). The preform forming machine 200 may be operated in an automated manner to fold and form dry fabric material into a three-dimensional shape. In addition, the preform forming machine 200 may be operated in an automated manner to hold or clamp the dry fabric material in a three-dimensional shape while a robotic stitching mechanism 304 inserts seams 160, 162, 164 of stitching into the preform 100.

Advantageously, the preform forming machine 200 mechanizes and automates a significant portion of the material handling tasks that are required for producing a three-dimensional preform 100 (FIG. 35). In this regard, the preform forming machine 200 and automated method disclosed herein eliminates a substantial portion of recurring skilled touch labor and associated quality issues related to fabrication of preforms. Furthermore, the preform forming machine 200 advantageously produces preforms 100 in a significantly reduced amount of time and at significantly reduced cost relative to preforms that are manually produced. In addition, the preform forming machine 200 produces highly accurate preforms 100 with minimal dimensional variation between the preforms 100. Such preforms 100 may be later assembled with other preform geometries to form a preform assembly that may be infused with resin and cured to form a unitized and integrally-stiffened composite structure (e.g., FIG. 40).

In FIG. 1, a single unit of the preform forming machine 200 may include a forming block assembly 204 and a clamping plate assembly 250. The forming block assembly 204 may include a forming table 222 supported on a lifting mechanism 280 for controlling and/or adjusting the vertical height of the forming table 222 during operation of the preform forming machine 200. The clamping plate assembly 250 may include a clamping table 264, and may also be supported on a lifting mechanism 280 for controlling and/or adjusting the vertical height of the clamping table 264. The lifting mechanism 280 for the clamping table 264 may be operated independently of the lifting mechanism 280 for the forming table 222. The lifting mechanisms 280 for the forming table 222 and the clamping table 264 may be mounted on a common base 202 as shown in FIG. 1. However, the lifting mechanisms 280 may be mounted on separate bases. Alternatively, each one of the lifting mechanisms 280 may be mounted directly on a shop floor or other support structure.

In FIG. 1, each one of the lifting mechanisms 280 is shown configured as a scissor lift 282 comprising crisscrossing diagonal members. Each lifting mechanism 280 may include a lifting actuator 284 extending between the base 202 and a structural tie (not shown) mounted between a parallel pair of the diagonal members. In an embodiment, the lifting actuator 284 may comprise a pneumatic actuator or air cylinder for raising or lowering the forming table 222 and/or the clamping table 264. A lower end of the lifting mechanism 280 may include one or more bumpers 286 for slowing and stopping the descent of the lifting mechanism 280 in a controlled manner. However, each lifting mechanism 280 may be provided in any one of a variety of different configurations for adjusting the vertical height of the forming table 222 and/or the clamping table 264, and is not limited to the scissor lift 282 arrangement in FIG. 1. For example, the lifting mechanism 280 may comprise one or more jacks (not shown) such as a pneumatic jack, a hydraulic jack, a mechanical jack such as a screw hack powered by an electric motor, or any one of a variety of other lifting mechanism configurations for controlling and/or adjusting the vertical height of the forming table 222 and the clamping table 264.

Figure 2:
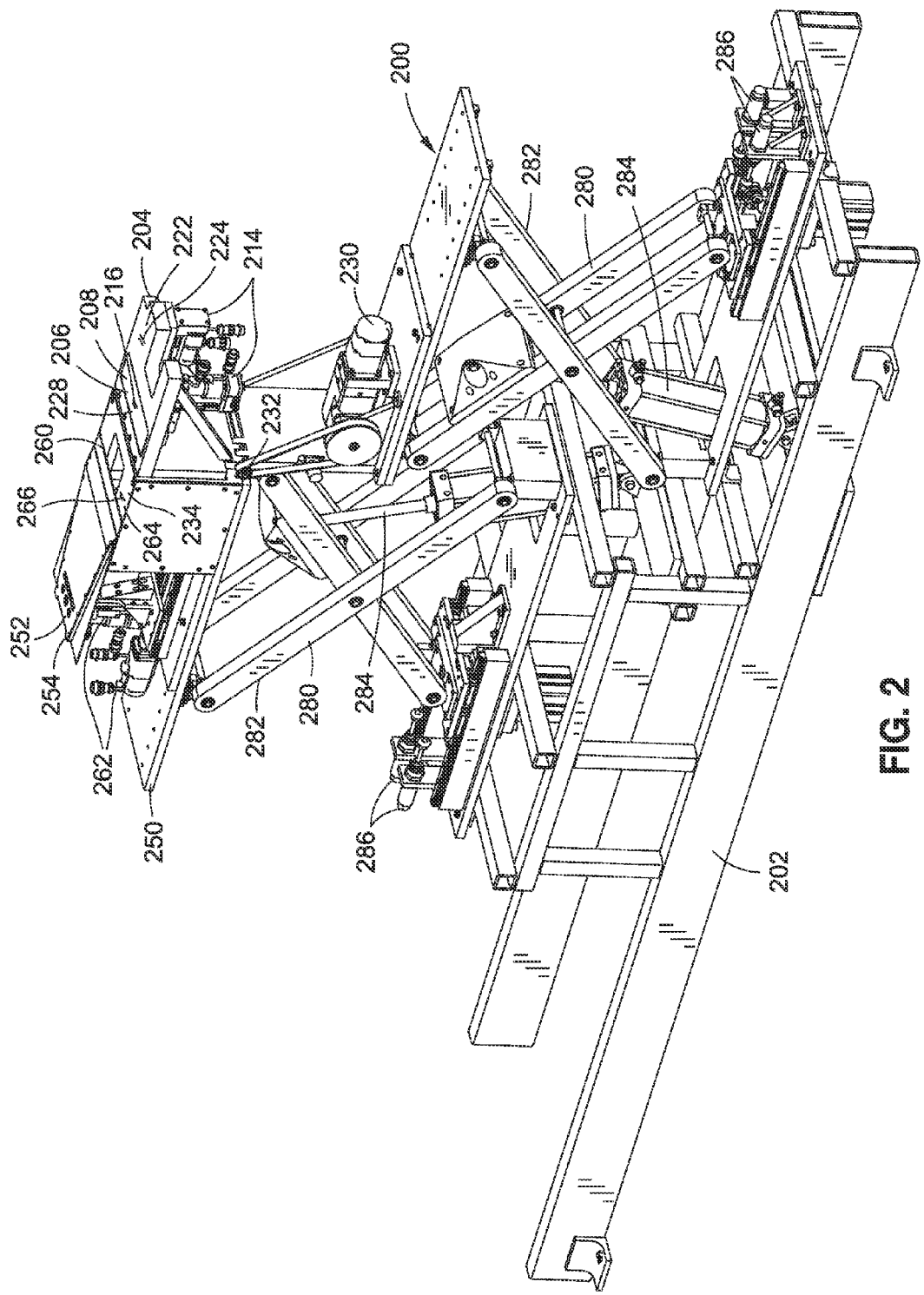
FIG. 2 is a further perspective illustration of the preform forming machine of FIG. 1.

In FIG. 1, the clamping plate assembly 250 may include a clamping plate 252 that may be movable relative to the clamping table 264. The clamping table 264 may have a clamping table outer face 266 that may be generally horizontally oriented although other orientations are contemplated. The clamping plate 252 may have a clamping plate lower face 258 (FIG. 7) and may terminate at a plate edge 260 (FIG. 2). The clamping plate 252 may be coupled to at least one clamping plate actuator 262 which, in an embodiment, may be mounted below the clamping table outer face 266 as shown in FIG. 1. The clamping plate actuator 262 may be configured for moving the clamping plate 252 along the clamping table outer face 266, and clamping a ply stack 124 (FIG. 8) of fabric plies 118 (FIG. 8) against the clamping table outer face 266 and/or against the forming table 222 outer face. In an embodiment, the clamping plate actuator 262 may comprise a vertical actuator and a horizontal actuator which may be configured as electromechanical devices or pneumatic devices for horizontally moving the clamping plate 252 relative to the clamping table outer face 266. The clamping plate actuators 262 may also be configured to vertically move the clamping plate 252 over the ply stack 124 and move the clamping plate 252 downwardly to clamp the ply stack 124 against the clamping table outer face 266 and/or the forming table outer face 224.

Referring to FIG. 2, the forming block assembly 204 may include a forming block 206 that may be movable relative to the forming table 222. The forming table 222 may have a forming table outer face 224 that may be oriented generally parallel to the clamping table outer face 266. Although the forming table outer face 224 and the clamping table outer face 266 are shown as being horizontally oriented, the forming table outer face 224 and the clamping table outer face 266 may be oriented at a non-horizontal orientation. Furthermore, although the figures (e.g., FIG. 8) of the present disclosure illustrate the forming table outer faces 224 and the clamping table outer faces 266 having the same horizontal orientation along the series of forming block assemblies 204 and clamping plate assemblies 250, the orientations of the forming table outer faces 224 and the clamping table outer faces 266 may vary along a length of the series.

In FIG. 2, the forming table 222 may include a table opening 228 (FIGS. 10-11) or a recess for receiving the forming block 206 in a retracted position 208. The forming block 206 may have a forming block outer face 216 that may be substantially flush or level with the forming table outer face 224 when the forming block 206 is in the retracted position 208. In an embodiment, the forming block 206 may be coupled to a forming block actuator 214 via a forming block shaft 212 (FIG. 12). In an embodiment, the forming block actuator 214 may be mounted below the forming table outer face 224. The forming block actuator 214 may comprise an electro-mechanical device, a pneumatic device, or other actuator configurations for vertically deploying the forming block 206, and moving the forming block 206 relative to the forming table outer face 224 such as in a horizontal direction, a vertical direction, in a diagonal direction, and/or in other directions relative to the forming table outer face 224 during the process of folding and clamping the ply stack 124 as described in greater detail below.

In FIG. 2, the forming block assembly 204 may further include a table rotation actuator 230 configured for rotating the forming block 206 and the forming table 222 about a table rotation axis 232. As described in greater detail below, the table rotation actuator 230 may be configured to rotate the forming table 222 from an orientation wherein the forming table outer face 224 is generally parallel to the clamping table outer face 266, to an orientation where the forming table end face 226 is generally parallel to the clamping table outer face 266. In an embodiment, the table rotation actuator 230 may comprise a right-angle gear box with motor that may be coupled to the forming table 222 via a pulley and belt arrangement. However, the table rotation actuator 230 may be provided in any one of a variety of different configurations for rotating the forming block 206 and forming table 222 relative to the clamping plate assembly 250, and is not limited to the arrangement illustrated in FIG. 2.

FIG. 3 shows an embodiment of the forming block assembly 204. As indicated above, the forming block assembly 204 may be supported on a lifting mechanism 280 such as the scissor lift 282 having a lifting actuator 284 for vertically controlling and/or adjusting the height of the forming table 222 relative to the clamping plate assembly 250. The lifting mechanism 280 may include one or more bumpers 286 for slowing the descent of the forming block assembly 204. The forming table 222 may be rotatable about the table rotation axis 232 via the table rotation actuator 230. The forming table 222 may include a forming table outer face 224 which is shown as being horizontally oriented in FIG. 3. The forming table 222 may further include a forming table end face 226 which is shown as being vertically oriented in FIG. 3.

FIG. 4 shows an embodiment of the clamping plate assembly 250 of the preform forming machine 200 unit of FIG. 1. The clamping plate assembly 250 may also be supported on lifting mechanism 280 which may be configured similar to the arrangement of the lifting mechanism 280 for the forming block assembly 204. However, the lifting mechanism 280 for the forming block assembly 204 may be configured differently than the lifting mechanism 280 for the clamping plate assembly 250. The clamping table 264 may include the clamping table outer face 266 which may initially be oriented generally parallel and flush at approximately the same height as the forming table outer face 224. The forming table outer face 224 and the clamping table outer face 266 may collectively define a layup surface 234 upon which dry fabric plies 118 may be laid up.

In FIG. 4, the clamping plate 252 may be movable relative to the clamping table outer face 266 as indicated above in order to clamp the ply stack 124 in position during folding of the ply stack 124 into a three dimensional shape. The clamping plate 252 may be movable to alternately clamp and unclamp the ply stack 124 during stitching of the ply stack 124. In this regard, the clamping plate assembly 250 may include one or more clamping plate actuators 262 such as a horizontal actuator and a vertical actuator which may operated in a coordinated manner for moving the clamping plate 252 between a retracted position 254 as shown in FIG. 8, and a clamped position 256 as shown in FIG. 9 for clamping the ply stack 124 as described below.

FIG. 5 shows a flat pattern 122 of a base ply 126 formed of dry fabric material and which may be laid up in a ply stack 124 on the preform forming machine 200 to fabricate a preform 100. In an embodiment, the dry fabric material may comprise composite ply material and may include woven fabric, bidirectional fabric, unidirectional tape, braided fabric, stitched fabric, and/or any other fabric configurations, without limitation. The dry fabric material may be formed of any suitable material including carbon fiber material or other material. In an embodiment, one or more base plies 126 may be pre-cut into a desired geometry and assembled in a preform kit (not shown). Each one of the base plies 126 may comprise a single fabric ply 118 and may have a predetermined fiber angle 120 or fiber orientation. One or more of the base plies 126 may be laid up in a ply stack 124. For example, a plurality of base plies 126 may be laid up in registration with one another in a predetermined ply stacking sequence on the layup surface 234. The layup surface 234 may be defined by the series of forming block assemblies 204 and clamping plate assemblies 250 arranged in side-by-side relation to one another as shown in FIG. 8. Different lengths, widths, and shapes of base plies 126 may be stacked on top of one another to form the ply stack 124.

FIGS. 6-7 illustrate configurations of doublers 128 of dry fiber fabric that may be pre-cut and kitted with one or more base plies 126 for layup on the layup surface 234 of the preform forming machine 200. The doublers 128 may be laid up in the ply stack 124 to provide localized ply buildups in the composite ply thickness such as in areas of localized loading on the stringer. For example, doublers 128 of one or more configurations may be positioned at locations where the stringer 102 attaches to other structure such as a frame, a rib, a bulkhead, or at locations where a system bracket (e.g., an electrical bracket) may be mounted to the stringer. The doublers 128 may have a width that may be different than the width of the base plies 126. For example, the doublers 128 shown in FIG. 6-7 are wider than the base plies 126. However, the doublers 128 may have a width that may be less than the width of the base plies 126. The doublers 128 may be located at any vertical position (i.e., in the thickness direction) in the ply stacking sequence (not shown).

Figure 8:
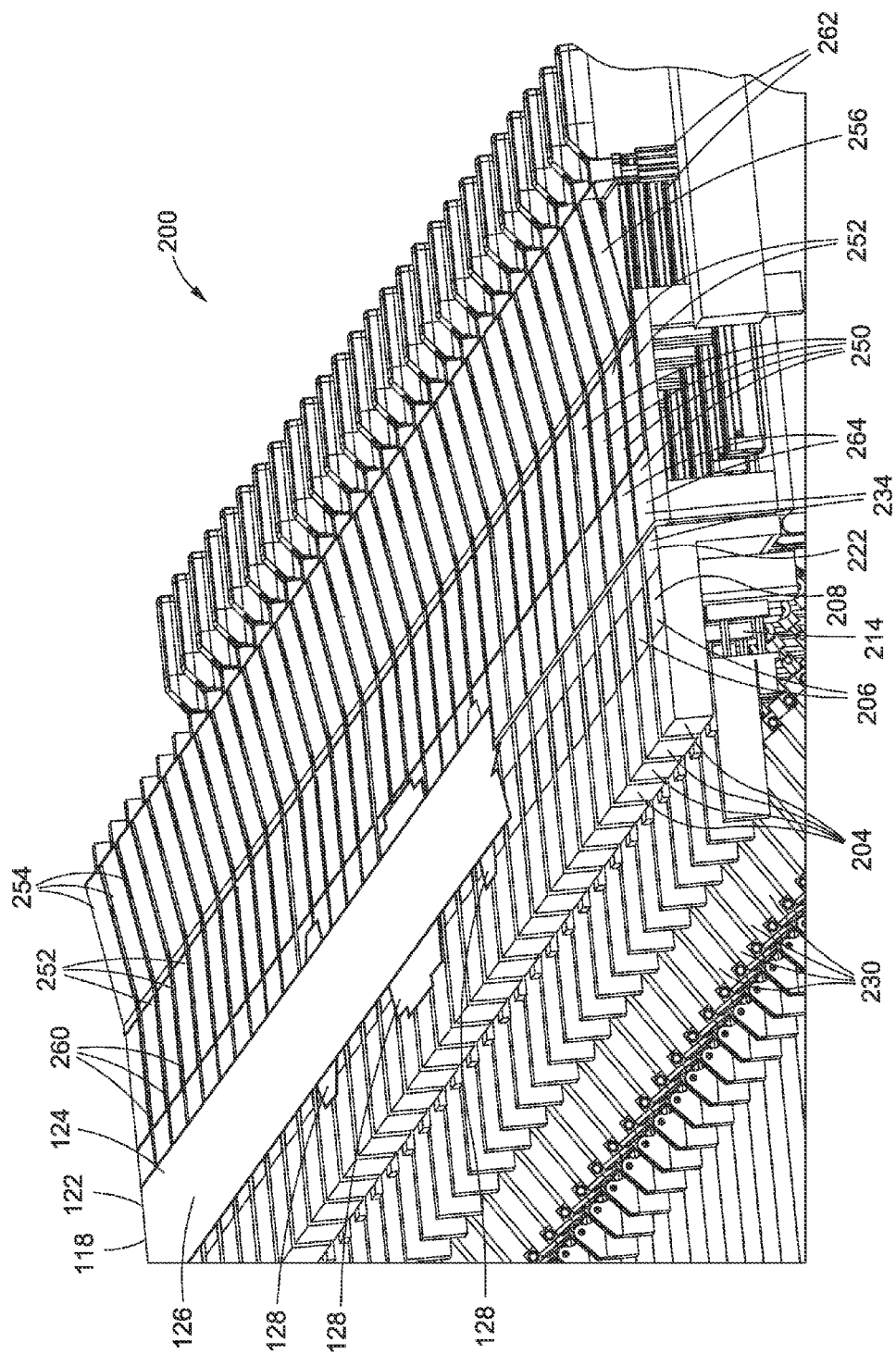
FIG. 8 is an illustration of a preform forming machine comprised of a series of forming block assemblies and a series of clamping plate assemblies, and further illustrating the doublers and one or more base plies laid up in a ply stack on a layup surface defined by the series of forming block assemblies and clamping plate assemblies.
Figure 9:
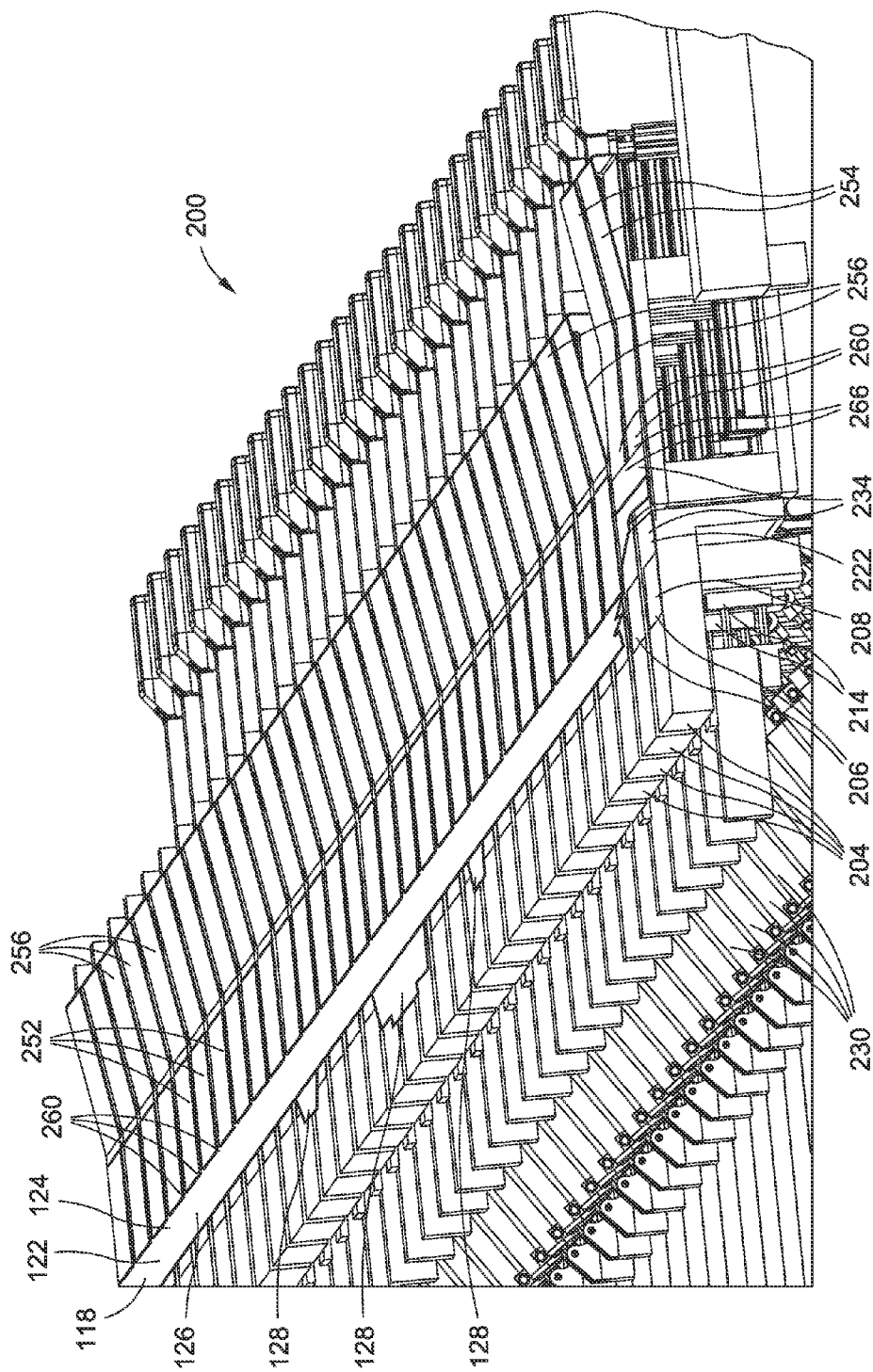

FIG. 8 illustrates a preform forming machine 200 comprised of a series of the forming block assemblies 204 and a series of the clamping plate assemblies 250. Each one of the clamping plates 252 is shown in a retracted position 254 to allow one or more base plies 126 and optionally one or more doublers 128 to be laid up in the ply stack 124 on the layup surface 234 defined by the series of forming tables 222 and clamping tables 264. It should be noted that the ply stack 124 is not limited to substantially identical base plies 126 wherein each base ply 126 has the same width and same length. For example, the base plies 126 may be provided in different lengths and which may result in ply additions (not shown) and ply drops (not shown) at different locations along the length of the ply stack 124. In an embodiment, the ply stack 124 may include a greater quantity of base plies 126 at one end of the preform 100 relative to the quantity of base plies 126 at an opposite end of the preform 100 due to ply additions or ply drops along the length of the preform 100. In addition, doublers 128 of any configuration may be positioned at any location along the ply stack 124, and are not limited to the positions shown in FIG. 8.

FIG. 9 illustrates the preform forming machine 200 wherein each one of the clamping plates 252 is in a clamped position 256 with the exception of two of the clamping plates 252 of an end of the series of clamping plate assemblies 250. As indicated above, each one of the forming block assemblies 204 may have a forming table 222 and a forming block 206 configured to fold the ply stack 124 over onto itself along a web fold line 132 (FIG. 11) to form a web 130 of a preform 100. The clamping plate assemblies 250 may be positionable in opposing relation to the forming block assemblies 204. For example, in the embodiment shown, each clamping plate assembly 250 may be positionable in opposing one-to-one relation to a forming block assembly 204 such that there are equivalent quantities of clamping plate assemblies 250 and forming block assemblies 204. However, although not shown, the preform forming machine 200 may be provided in an arrangement wherein there are unequaled quantities of clamping plate assemblies 250 and forming block assemblies 204.

In FIG. 9, the clamping plate 252 of each one of the clamping plate assemblies 250 may be configured to clamp the ply stack 124 to the forming table 222 and/or to the clamping table 264. For example, each clamping plate 252 may be configured to successively clamp the ply stack 124 to the forming table 222 and/or to the clamping table 264 as the ply stack 124 is laid up on the layup surface 234. In addition, each clamping plate 252 may be configured to clamp the ply stack 124 in position during the folding of the ply stack 124 by the forming blocks 206. As described in greater detail below, each forming block 206 may be configured to clamp the web 130 against the forming table 222 such that a protruding portion 142 (FIG. 19) of the web 130 extends beyond a forming block end face 218 of the forming block.

FIGS. 10-15 illustrate the process of folding the ply stack 124 into a web 130 of a stringer preform 100. It should be noted that the preform forming machine 200 and method disclosed herein is not limited to forming a stringer preform 100. In this regard, the preform forming machine 200 may be implemented for automated forming of three-dimensional preforms 100 such as stiffeners, frames, spars, and other three-dimensional preforms 100. In addition, the preform forming machine 200 may be implemented for forming material other than dry fabric into a three-dimensional shape.

FIG. 10 illustrates a leader wire 136 positioned over the ply stack 124. The leader wire 136 may extend along a length of the series of forming block assemblies 204 and clamping plate assemblies 250. The leader wire 136 may be temporarily placed on the ply stack 124 at a predetermined location which may define a web fold line 132 for the web 130 of the preform 100. The leader wire 136 may be formed of a material that is compatible with the dry fabric material such as metallic material, ceramic material, or other material. The leader wire 136 may be removed after completion of the three-dimensional preform 100.

In FIG. 10, in an embodiment, the leader wire 136 may be placed on the ply stack 124 adjacent to the forming block end faces 218 of the series of forming blocks 206. The clamping plates 252 may be positioned on or over the ply stack 124 to clamp the ply stack 124 down onto the forming block 206. In this regard, when the clamping plates 252 are clamped over the ply stack 124 as shown in FIG. 10, the plate edges 260 of the clamping plates 252 may be located adjacent to the forming block end faces 218. However, the clamping plates 252 may be positioned such that the plate edges 260 of the clamping plates 252 are located adjacent to the clamping table end faces 268. In an embodiment, the leader wire 136 may be positioned laterally between the plate edges 260 and the forming block end faces 218. However, the leader wire 136 may be placed at any location on the ply stack 124. Alternatively, the leader wire 136 may be omitted, and the forming blocks 206 may be configured to fold the ply stack 124 along the series of plate edges 260 which may define the web fold line 132.

FIG. 11 illustrates the forming blocks 206 being initially deployed out of the table opening 228 such as in a vertical direction. The forming block actuators 214 may move the forming blocks 206 in a manner to fold the ply stack 124 along the leader wire 136 positioned on the ply stack 124. In FIGS. 10-15, the base plies 126 and/or the doublers 128 of the ply stack 124 may be configured to generally straddle the clamping tables 264 and forming tables 222 such that at least a portion of the ply stack 124 overlaps the forming blocks 206. However, the base plies 126 and/or the doublers 128 may be laid up in a manner overlapping only the forming table 222 and the forming blocks 206, and not overlapping the clamping tables 264.

FIG. 12 illustrates the forming blocks 206 at an end of the vertical deployment of the forming blocks 206. As indicated earlier, each one of the forming blocks 206 may be operatively coupled to a vertical actuator. The vertical actuator of each forming block 206 may be operated in a coordinated manner with a horizontal actuator of the forming block 206 for moving the forming block 206 during the folding and the clamping of the ply stack 124.

FIG. 13 illustrates the forming block 206 moving in a horizontal direction as the forming block end faces 218 and the forming block lower faces 220 fold the ply stack 124 around and over the leader wire 136. The leader wire 136 may be fixedly held in position by the plate edges 260 of the clamping plates 252 to prevent movement of the leader wire 136 relative to the ply stack 124 during the folding process. In an embodiment, the leader wire 136 may be provided in a thickness that is complementary to a thickness of the clamping plate 252 at the plate edge 260. For example, the leader wire 136 may be provided in a thickness that is substantially equivalent to the thickness of the clamping plate 252 at least at the plate edge 260.

FIG. 14 illustrates horizontal movement of the forming blocks 206 into a clamped position 210 following the completion of the folding of the ply stack 124 along the web fold line 132. The folded ply stack 124 forms overlapping layers 140 comprising a folded-over portion 138 of the web 130. The leader wire 136 may be positioned such that a protruding portion 142 of the overlapping layers 140 protrudes beyond the forming block end faces 218 and forming table end faces 226. After folding of the web 130, the clamping plates 252 may remain sandwiched between the overlapping layers 140, and may clamp one of the overlapping layers 140 of the folded-over portion 138 against the forming table outer face 224 and the clamping table outer face 266.

In FIG. 14, the forming block lower faces 220 may be configured to clamp the overlapping layers 140 and the clamping plates 252 against the forming table outer faces 224. With the forming blocks 206 in the clamped position 210, the forming block end faces 218 may be substantially flush or parallel with the forming table end faces 226. However, the forming block end faces 218 and the clamping table end faces 268 may be oriented in non-parallel relation (not shown) to one another as may be desirable to form the flanges 148 (FIG. 30) which are non-parallel to one another (not shown). In addition, the forming block end faces 218 and the clamping table end faces 268 may be non-flush (not shown) with one another.

FIG. 15 illustrates the preform forming machine 200 after forming the web 130 which is clamped in position by the forming blocks 206 and the clamping plates 252 in their respective clamped positions 210, 256. As indicated above, each one of the forming block assemblies 204 and clamping plate assemblies 250 may be individually mounted on lifting mechanisms 280 as shown in FIGS. 3-4. The lifting mechanisms 280 may advantageously allow for adjustment of the vertical position of each one of the forming block assemblies 204 and clamping plate assemblies 250 independent of one another as may be required during subsequent forming operations such as a stitching operation that may be performed by a stitching mechanism 304 (FIG. 15).

FIG. 16 illustrates the independent vertical movement of the forming block assemblies 204 and the clamping plate assemblies 250 which are each operatively coupled to lifting mechanisms 280. The lifting mechanisms 280 are configured to sequentially displace the forming block assemblies 204 and the clamping plate assemblies 250 to create a moving machine gap 236 within the series of forming block assemblies 204 and clamping plate assemblies 250. The moving machine gap 236 provides a clear path for the stitching mechanism 304 during the process of stitching together the overlapping layers 140 of the web 130. The lifting mechanisms 280 are configured to operate in coordination with the forming block actuators 214 and the clamping plate actuators 262 which are configured to sequentially release or unclamp the forming blocks 206 and the clamping plates 252 from the web 130 and move the forming blocks 206 and clamping plates 252 from their respective clamped positions 210, 256 toward their respective retracted positions 208, 254 just prior to the vertical movement (e.g., downward movement) of the forming block assemblies 204 and clamping plate assemblies 250 by the corresponding ones of the lifting actuators 284.

In FIG. 16, the forming blocks 206 and clamping plates 252 located on opposite sides of the moving machine gap 236 continue to clamp the web 130 in position during the stitching process. After the stitching mechanism 304 inserts the seams 158 into each portion of the web 130 within the machine gap 236, the lifting mechanisms 280 sequentially return the forming block assemblies 204 and the clamping plate assemblies 250 back to their original vertical position. The forming block actuators 214 and the clamping plate actuators 262 also sequentially move the forming blocks 206 and the clamping plates 252 from their respective retracted positions 208, 254 back to their respective clamped positions 210, 256. FIG. 16 illustrates the stitching mechanism 304 inserting an inner web seam 160 along the folded web edge 134 of the web 130.

FIG. 17 illustrates the stitching mechanism 304 inserting an outer web seam 162 along a web-flange fold line 154 of the web 130. The stitching mechanism 304 may be provided as an end effector 302 mounted on a manipulator arm 306 of a robotic device 300. In an embodiment, the stitching mechanism 304 may be mounted on a six-degree-of-freedom manipulator arm 306 and may be configured to move lengthwise along the length of the preform forming machine 200. Alternatively, the stitching mechanism 304 may be mounted to an overhead gantry or other support system. The stitching mechanism 304 may include a single needle 308 and hook configured for a two-sided stitching process as illustrated in FIGS. 16-17. Alternately, the stitching mechanism 304 may be configured for a one-sided stitching process such as by using two needles (not shown) operatively coupled to an end effector 302.

FIG. 18 illustrates the clamping plates 252 in the retracted position 254 and the web 130 clamped in position by the forming blocks 206 following the stitching operation. The protruding portion 142 of the web 130 protrudes beyond the forming block end faces 218 and the forming table end faces 226. The forming table outer faces 224 are in a horizontal orientation at the same vertical level as the clamping table outer faces 266.

FIG. 19 illustrates the forming blocks 206 and the forming tables 222 being rotated in unison about the table rotation axis 232. As indicated above, each one of the forming block assemblies 204 may include a table rotation actuator 230 for rotating the forming tables 222 relative to the clamping plate assemblies 250. In FIG. 19, the web 130 remains clamped between the forming blocks 206 and the forming tables 222 during rotation of the forming tables 222. The protruding portion 142 of the web 130 is shown protruding outwardly from the forming block end faces 218 and the forming table end faces 226.

FIG. 20 illustrates the forming blocks 206 and forming tables 222 following rotation thereof relative to the clamping plate assemblies 250. The forming block end faces 218 and the forming table end faces 226 are generally horizontally oriented. The protruding portion 142 of the web 130 protrudes vertically upwardly from the forming block end face 218 and the forming table end face 226.

FIG. 21 illustrates the initial stage of the clamping tables 264 being moved downwardly by the lifting mechanisms 280 which may be coupled to each one of the clamping tables 264. The clamping table end faces 268 are positioned in opposing relation to the forming table end faces 226. The clamping plates 252 are in the retracted position 254.

FIGS. 22-23 illustrate the clamping tables 264 lowered such that the clamping table outer faces 266 are approximately level or flush with the forming table end faces 226 and the forming block end faces 218. The forming block end faces 218 and the forming table end faces 226 may be configured such that the protruding portion 142 is foldable thereagainst to form a pair of flanges 148 of the preform 100. For example, the forming block end faces 218 and the forming table end faces 226 may be configured such that the overlapping layers 140 of the protruding portion 142 are foldable downwardly away from one another in opposite directions along a pair of web-flange fold lines 154. The web-flange fold lines 154 may be defined by the corners of the forming block end face 218 and the forming table end faces 226. In an embodiment, the corners of the forming block end faces 218 and the forming table end faces 226 may be provided with a radius such that a corresponding radius (not shown) may be formed in the preform 100 along the web-flange fold lines 154. In an embodiment, the corners of the forming block end faces 218 and the forming table end faces 226 may be provided with a radius in the range of from approximately 0.06 inch to 0.25 inch or larger.

FIG. 24 is an enlarged view of a portion of the preform forming machine 200 of FIG. 23. FIG. 24 illustrates several of the clamping plate assemblies 250 wherein the clamping plates 252 are in the retracted position 254. The protruding portion 142 protrudes upwardly from the forming block end faces 218 and the forming table end faces 226 (not shown).

FIG. 25 illustrates the protruding portion 142 after being folded over the corners of the forming block end faces 218 and the clamping plate 252 end faces to form the opposing pair of flanges 148. The corners of the forming block end faces 218 and the forming table end faces 226 may each define a web-flange fold line 154. In this regard, one of the overlapping layers 140 of the protruding portion 142 may be folded over against the forming block 206 end face, and a remaining one of the overlapping layers 140 of the protruding portion 142 may be folded over against the forming table end face 226. A wedge-shaped groove may be formed at the radius 150 between the web 130 and the flanges 148.

FIG. 26 illustrates the application of a tear strap 156 over the flanges 148. In an embodiment, a noodle or radius filler 152 having a wedge-shaped cross section may be inserted into the radius 150 or groove between the web-flange fold lines 154. The tear strap 156 may be installed over the radius filler 152. The clamping plates 252 may remain in a refracted position 254 while the tear strap 156 and radius filler 152 are installed. In an embodiment, the tear strap 156 may be provided in a profile (e.g., a length and a width) that substantially duplicates the profile of the opposing flanges 148 of the preform 100.

FIG. 27 is an enlarged view of the tear strap 156 showing the tear strap being applied over the flanges 148. The clamping plates 252 are in the retracted position 254 while the tear strap 156 and radius filler 152 are installed over the flanges 148. In an embodiment, the radius filler 152 may be integral with the tear strap 156 such that the tear strap 156 and the radius filler 152 form a unitary tear strap assembly 153 allowing the tear strap 156 and the radius filler 152 to be installed simultaneously.

FIG. 28 illustrates an end view of the stringer 102 preform 100 clamped within the preform forming machine 200. The tear strap 156 is shown having a single fabric ply 118. However, the tear strap 156 may be comprised of multiple fabric plies 118. The radius filler 152 is shown captured within the radius 150 or groove between the tear strap 156 and the opposing flanges 148. As indicated above, the radius filler 152 may be integrally formed with the tear strap 156 or preassembled with the tear strap 156 to form the unitary tear strap assembly 157.

FIG. 29 illustrates the sequential clamping of the clamping plates 252 over the tear strap 156 to clamp the tear strap 156 and the radius filler 152 in position along the length of the flanges 148. The tear strap 156 may be formed of dry fiber material which may be the same or different than the dry fiber material from which the base plies 126 and the doublers 128 are formed. The tear strap 156 may also be provided in a similar or different thickness than the fabric plies 118 of the ply stack 124. In addition, the tear strap 156 may have a fiber angle 120 that may be complementary to the fiber angle 120 of the fabric plies of the flanges 148.

FIG. 30 is an enlarged view of the tear strap assembly 157 during the sequential clamping by the clamping plates 252 over the tear strap 156. The radius filler 152 may be assembled with the tear strap 156 at an offline location to form the tear strap assembly 157. Alternatively, the radius filler 152 may be applied as a separate component (not shown) from the tear strap 156. The radius filler 152 may be inserted into the groove between the flanges 148. After installation of the separate radius filler 152, the tear strap 156 may be applied over the radius filler 152 and flanges 148. The clamping plates 252 may sequentially clamp the tear strap 156 in position over the flanges 148 as the tear strap 156 is installed.

FIGS. 31-32 illustrate the independent vertical movement or displacement of the forming block assemblies 204 and the clamping plate assemblies 250 by the lifting mechanisms 280 to create a moving machine gap 236 for a stitching mechanism 304 inserting a flange seam to stitch together the tear strap 156 and one of the flanges 148. The operation of the lifting mechanisms 280 in vertically moving the block assemblies 204 and the clamping plate assemblies 250 may be coordinated with the forming block actuators 214 and the clamping plate actuators 262 which may be configured to sequentially unclamp the forming blocks 206 from the web 130 and unclamp the clamping plates 252 from the flanges 148 during the stitching process. The stitching mechanism 304 may be configured similar to the stitching mechanism 304 described above with regard to the insertion of one or more flange seams 164 into the flanges 148 and tear strap 156. In an embodiment, the stitching mechanism 304 may be configured to insert an inner flange seam 164 proximate the web-flange fold line 154 on each side of the flanges 148. Optionally, the stitching mechanism 304 may also be implemented for inserting an outer flange seam 164 located proximate the flange edge of each flange 148.

FIG. 33 is a schematic illustration of a blade cross-section 104 embodiment of a stringer preform 100 that may be fabricated using the preform forming machine 200 disclosed herein. After completion of the stringer preform 100, the leader wire 136 may be removed to form the blade section stringer preform 100. In an embodiment, the stringer preform 100 may be formed from a single base ply 126 that may be folded into a web 130 and a pair of opposing flanges 148. However, the stringer preform 100 may be formed of any number of base plies 126 and any number of doublers 128. One or more single-ply tear straps 156 may be applied over the flanges 148 and which may capture the radius filler 152 within the intersection of the web 130 with the flanges 148. An outer web seam 162 may be inserted proximate the folded web edge 134 such as by using the stitching mechanism 304. An inner web seam 160 may be inserted proximate the web-flange fold line 154. Likewise, a flange seam 164 may be inserted on opposite sides of the radius filler 152 to secure the tear strap 156 to the flanges 148.

FIGS. 34-35 illustrate a bulb cross-section 106 embodiment of the stringer preform 100 wherein the leader wire 136 is removed and replaced with a rod 144 that may have a larger diameter than the original leader wire 136. The rod 144 may be installed between the overlapping layers 140 at a location between the folded web edge 134 and the outer web seam 162. In an embodiment, the rod 144 may be formed as a pultruded carbon fiber rod 144 and may be permanently installed in the folded web edge 134. However, other bulb-forming devices may be inserted in the folded web edge 134 to form a bulb cross-section 106 of the stringer preform 100.

FIG. 36 illustrates a further blade cross-section 106 embodiment of the stringer preform 100 which may be formed and/or assembled by the preform forming machine 200. The blade cross-section 106 includes two fabric plies 118 to form the web 130 and the flanges 148 of the stringer preform 100. The fabric plies 118 are folded over one another along a web fold line 132. The tear strap 156 includes a single fabric ply 118. A radius filler 152 is captured between the tear strap 156 and the opposing flanges 148.

FIG. 37 illustrates a further blade cross-section 106 embodiment similar to the blade cross-section 106 embodiment shown in FIG. 36 with the exception that the web 130 of the blade-cross section 106 of FIG. 37 has free edges instead of a web fold line 132. The inner web seam 160 and the outer web seam 162 hold the fabric plies 118 together along the web 130. A pair of flange seams 164 hold the fabric plies 118 together along the flanges 148.

FIG. 38 illustrates a J cross-section 166 embodiment of the stringer preform 100 and which may be at least partially formed and/or assembled by the preform forming machine 200. The J cross-section 166 embodiment may include an additional flange 148 along the edge of the web 130. After forming the preform 100 in a blade cross-section 106, the web 130 may be folded over such as at 90 degrees (or other angle) to the web 130 to form the additional flange 148. The fabric plies 118 may be stitched together with inner and outer web seams 160, 162 and with flange seams 164 to hold the fabric plies 118 into the J cross-section 166 shape.

FIG. 39 illustrates an I cross-section 168 embodiment of the stringer preform 100 and which may be at least partially formed and/or assembled by the preform forming machine 200. The I cross-section 168 embodiment may include opposing pairs of flanges 148, a radius filler 152, and tear straps 156 along each one of the opposing edges of the web 130. The fabric plies 118 may be stitched together along inner web seams 160, outer web seams 162, and flange seams 164 to hold the fabric plies 118 into the I-shape.

FIG. 40 illustrates an integrally stiffened composite panel 110 containing a plurality of three-dimensional stringers 102 that may be produced in accordance with an embodiment of the preform forming machine 200 disclosed herein. The integrally stiffened composite panel 110 may be similar to the composite panel disclosed in U.S. Pat. No. 8,042,767 issued on Oct. 25, 2011, to Velicki et al. and entitled COMPOSITE FABRIC WITH RIGID MEMBER STRUCTURE, the entire contents of which is expressly incorporated by reference herein. In FIG. 40, one or more of the three-dimensional dry fiber stringer 102 preforms 100 may be assembled with other stringer preforms and/or other types of dry fiber preforms of the same or different configuration. For example, a plurality of the completed stringer 102 preforms 100 (e.g., FIG. 35) may be assembled in a composite assembly 108 including other preforms such as frames 112, bulkhead caps 114, and rib caps 116. The preforms 100 may be assembled and/or stitched to a dry fiber preform panel which may be formed as a stack of carbon fiber material or other material. The preform assembly may be consolidated and/or debulked, infused with resin such as in a resin infusion process, and cured under heat and/or pressure to form a final composite structure. The final composite structure may be used in a composite structural assembly of an aircraft such as in a wing and/or a fuselage of an aircraft, or in any other vehicular or non-vehicular application.

FIG. 41 illustrates a flow chart containing one or more operations that may be included in a method 400 of forming a preform 100 using the preform forming machine 200 disclosed herein. As indicated above, the preform forming method 400 advantageously automates a significant portion of the material handling tasks required for fabricating a three-dimensional preform 100. The automated method produces dimensionally-accurate preforms 100 in a significantly reduced amount of time and at significantly reduced cost relative to preforms that are manually produced.

Step 402 of the method 400 of FIG. 41 may include applying a ply stack 124 of fabric plies 118 on a layup surface 234 as shown in FIG. 8. As indicated above, the layup surface 234 may be defined by the series of forming block assemblies 204 and the series of clamping plate assemblies 250. The series of clamping plate assemblies 250 may be positioned opposite the series of forming block assemblies 204.

Step 404 of the method 400 of FIG. 41 may optionally include positioning a leader wire 136 lengthwise along the ply stack 124 to define a web fold line 132 as shown in FIG. 10. In an embodiment, the leader wire 136 may be positioned proximate the forming block end faces 218 of the forming blocks 206 and/or along the plate edges 260 of the clamping plate 252. Alternatively, the leader wire 136 may be omitted and the plate edges 260 of the clamping plates 252 may be used to define the web fold line 132.

Step 406 of the method 400 of FIG. 41 may include clamping the ply stack 124 against the layup surface 234 using the clamping plates 252 as shown in FIG. 10. As indicated above, the clamping plates 252 may be positioned such that the plate edges 260 are positioned adjacent to the web fold line 132 and/or adjacent to the leader wire 136.

Step 408 of the method 400 of FIG. 41 may include folding the ply stack 124 about a web fold line 132 to form overlapping layers 140 of a web 130 as shown in FIGS. 12-14. As indicated above, the web fold line 132 may be defined by the leader wire 136 or by the plate edges 260 of the clamping plates 252. The ply stack 124 may be folded over the leader wire 136 using a plurality of forming blocks 206 that may collectively urge or fold the ply stack 124 over onto itself to form overlapping layers 140 of the web 130. The clamping plates 252 may be sandwiched between the overlapping layers 140.

Step 410 of the method 400 of FIG. 41 may include clamping the overlapping layers 140 against the layup surface 234 using the forming block lower faces 220 of the forming blocks 206. The forming blocks 206 may be placed in a clamped position 210 such that the forming block end faces 218 are substantially flush (e.g., parallel) with the forming table end faces 226. A protruding portion 142 of the overlapping layers 140 of the web 130 may protrude beyond the forming block end faces 218 as shown in FIG. 14.

Step 412 of the method 400 of FIG. 41 may include stitching the overlapping layers 140 of the folded-over portion 138 together such as by using a stitching mechanism 304 as illustrated in FIG. 15. The stitching mechanism 304 may be configured to insert a web seam 158 extending lengthwise along the overlapping layers 140 of the web 130.

Step 414 of the method 400 of FIG. 41 may include sequentially moving the forming block assemblies 204 and clamping plate assemblies 250 (e.g., downwardly) away from the folded-over portion 138 while the stitching mechanism 304 stitches the web seam 158 lengthwise along the web 130 as shown in FIGS. 16-17. In an embodiment, the method may include unclamping the forming block 206 and the clamping plate 252 from the folded-over portion 138 in coordination with the sequential downward displacement of the forming block assemblies 204 and clamping plate assemblies 250 in a manner generating a moving machine gap 236 between the forming block assemblies 204 and the clamping plate assemblies 250. The machine gap 236 may provide a path for the stitching mechanism 304 to move along the length of the folded-over portion 138 to allow for stitching together the overlapping layers 140 along the web seam 158.

Step 416 of the method 400 of FIG. 41 may include rotating the forming tables 222 such that the forming table end faces 226 are oriented generally parallel to the clamping plate 252 and/or the clamping table outer faces 266. In an embodiment, the method may include rotating the forming tables 222 approximately 90 degrees about a table rotation axis 232 as shown in FIGS. 18-20, although the forming tables 222 may be rotated at different angles (i.e., other than 90 degrees) depending on the geometry of the forming table end faces 226 and forming block end faces 218.

Step 418 of the method 400 of FIG. 41 may include moving (e.g., lowering) the clamping plate assemblies 250 as shown in FIGS. 20-22 such that the clamping table outer faces 266 are substantially flush with the forming block end faces 218 and the forming table end faces 226. Alternatively, Step 418 may include moving (e.g., raising) the forming block assemblies 204 until the forming block end faces 218 and the forming table end faces 226 are substantially flush with the clamping table outer faces, or a combination of lowering the clamping plate assemblies 250 and raising the forming block assemblies 204 until the clamping table outer faces 266 are substantially flush with the forming block end faces 218 and the forming table end faces 226.

Step 420 of the method 400 of FIG. 41 may include folding the overlapping layers 140 of the protruding portion 142 along a web-flange fold line 154 to form one or more flanges 148. In an embodiment, the overlapping layers 140 may be folded in opposite directions to form an opposing pair of flanges 148 as shown in FIGS. 24-25.

Step 422 of the method 400 of FIG. 41 may include inserting a radius filler 152 in the web-flange fold line 154 at the intersection of the web 130 with the flanges 148. In an embodiment, the radius filler 152 may be formed of composite material that is compatible with the dry fiber fabric material of the preform 100. For example, the radius filler 152 may be formed of carbon fiber material.

Step 424 of the method 400 of FIG. 41 may include applying a tear strap 156 over the one or more flanges 148 as shown in FIG. 26. The method may further include using the clamping plates 252 to sequentially clamp the tear strap 156 and flanges 148 against the forming block end faces 218 and the forming table end faces 226 as the tear strap 156 is applied along the length of the flanges 148. As indicated above, the tear strap 156 may be configured as a tear strap assembly 157 having an integral radius filler 152 to allow for simultaneous installation of the tear strap 156 and the radius filler 152 as a unit assembly 157 as shown in FIGS. 27-30.

Step 426 of the method 400 of FIG. 41 may include stitching the tear strap 156 and the flanges 148 along one or more flange seams 164 as shown in FIGS. 31-32. The method may include using a stitching mechanism 304 of a robotic device 300 to insert the web 130 flange stitching lengthwise along the flange 148.

Step 428 of the method 400 of FIG. 41 may include sequentially moving the forming block assemblies 204 and the clamping plate assemblies 250 away from the tear strap 156 and the flanges 148 while the stitching mechanism 304 stitches the flange seam 164 as shown in FIGS. 31-32. As indicated above, the lifting mechanisms 280 may be coordinated to sequentially move the forming block assemblies 204 and clamping plate assemblies 250 to generate the moving machine gap 236 for the stitching mechanism 304. The method may include unclamping the forming blocks 206 from the web 130 and unclamping the clamping plates 252 from the flanges 148 in coordination with the moving (e.g. downward movement) of the forming block assemblies 204 and clamping plate assemblies 250.

Step 430 of the method 400 of FIG. 41 may include removing the leader wire 136 from the web 130, and inserting a rod 144 within the web fold line 132 to form a bulb 146 in the stringer preform 100 as shown in FIGS. 34-35. However, as indicated above, the leader wire 136 may be removed and the rod 144 may be omitted to form a stringer preform 100 having a blade cross-section 104 as shown in FIG. 33.

Referring to FIGS. 42-43, embodiments of the disclosure may be described in the context of an aircraft manufacturing and service method 500 as shown in FIG. 42 and an aircraft 502 as shown in FIG. 43. During pre-production, exemplary method 500 may include specification and design 504 of the aircraft 502 and material procurement 506. During production, component and subassembly manufacturing 508 and system integration 510 of the aircraft 502 takes place. Thereafter, the aircraft 502 may go through certification and delivery 512 in order to be placed in service 514. While in service by a customer, the aircraft 502 is scheduled for routine maintenance and service 516 (which may also include modification, reconfiguration, refurbishment, and so on).

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 43, the aircraft 502 produced by exemplary method 500 may include an airframe 518 with a plurality of systems 520 and an interior 522. Examples of high-level systems 520 include one or more of a propulsion system 524, an electrical system 526, a hydraulic system 528, and an environmental system 530. Any number of other systems may be included. Although an aerospace example is shown, the principles of the invention may be applied to other industries, such as the automotive industry.

Apparatus and methods embodied herein may be employed during any one or more of the stages of the production and service method 500. For example, components or subassemblies corresponding to production process 508 may be fabricated or manufactured in a manner similar to components or subassemblies produced while the aircraft 502 is in service. Also, one or more apparatus embodiments, method embodiments, or a combination thereof may be utilized during the production stages 508 and 510, for example, by substantially expediting assembly of or reducing the cost of an aircraft 502. Similarly, one or more of apparatus embodiments, method embodiments, or a combination thereof may be utilized while the aircraft 502 is in service, for example and without limitation, to maintenance and service 516.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A preform forming machine for producing a three-dimensional dry fiber preform, comprising:
    a forming block assembly having a forming table and a forming block and being positionable in a series of forming block assemblies;
    a clamping plate assembly having a clamping table and a clamping plate and being positionable in a series of clamping plate assemblies arranged in opposing relation to the series of forming block assemblies;
    the forming block being configured to fold a ply stack over onto itself to form a web of the preform; and
    the clamping plate being configured to clamp the ply stack to the forming table prior to and during the folding of the ply stack.

2. The preform forming machine of claim 1, wherein:
    the forming block is configured to clamp the web against the forming table.

3. The preform forming machine of claim 1, wherein:
    the forming block is deployable from a retracted position; and
    a forming block outer face being substantially flush with a forming table outer face when the forming block is in the retracted position.

4. The preform forming machine of claim 1, wherein:
    the forming block is configured to fold the ply stack along a leader wire positionable on the ply stack.

5. The preform forming machine of claim 1, wherein:
    the forming block is configured to fold the ply stack along a plate edge of the clamping plate.

6. The preform forming machine of claim 1, wherein:
    the forming block and the forming table are rotatable relative to the clamping plate assembly.

7. The preform forming machine of claim 1, further comprising:
    a lifting mechanism operatively coupled to the clamping plate assembly and configured to adjust a height of the clamping table to be substantially level with a forming table end face and a forming block end face.

8. The preform forming machine of claim 1, wherein:
    the forming block and the forming table have end faces configured such that a protruding portion of the web is foldable thereagainst to form one or more flanges of the preform while the web is clamped between the forming block and the forming table.

9. The preform forming machine of claim 8, further comprising:
    the clamping plate being configured to clamp a tear strap over the flanges and against the forming block end face and the forming table end face.

10. The preform forming machine of claim 1, further comprising:
    a plurality of lifting mechanisms operatively coupled to a corresponding plurality of the forming block assemblies and the clamping plate assemblies; and
    the plurality of lifting mechanisms being configured to sequentially displace the forming block assemblies and the clamping plate assemblies and create a moving machine gap for a stitching mechanism.

11. The preform forming machine of claim 10, further comprising:
   a plurality of actuators operatively coupled to corresponding ones of the forming blocks and the clamping plates; and
   the actuators being configured to sequentially unclamp the forming blocks and the clamping plates from the web in coordination with a displacement of the forming block assemblies and clamping plate assemblies by the lifting mechanisms.

12. A preform forming machine for producing a three-dimensional dry fiber preform, comprising:
   a series of forming block assemblies arranged in side-by-side relation to one another, each one of the forming block assemblies having a forming table and a forming block;
   a series of clamping plate assemblies arranged in side-by-side relation to one another and in opposing relation to the series of forming block assemblies and having a clamping table and a clamping plate
   each forming block being configured to fold a ply stack over onto itself to form a web of the preform; and
   each clamping plate being configured to clamp the ply stack to the forming table prior to and during the folding of the ply stack.

13. A method of producing a three-dimensional dry fiber preform, comprising the steps of:
   laying up a ply stack of fabric plies on a layup surface defined by a series of forming block assemblies and a series of clamping plate assemblies positioned in opposing relation to the series of forming block assemblies;
   clamping, using clamping plates of the series of clamping plate assemblies, the ply stack to the layup surface; and
   folding, using forming blocks of the series of forming block assemblies, the ply stack about a web fold line prior to and during the clamping of the ply stack to the layup surface to form overlapping layers of a web of the preform.

14. The method of claim 13, further comprising:
   clamping, using the forming blocks, the web against the layup surface such that a protruding portion of the web protrudes beyond forming block end faces.

15. The method of claim 13, further comprising:
   rotating the forming tables such that forming table end faces and forming block end faces are generally parallel to the clamping table outer faces; and
   adjusting, using lifting mechanisms, a height of the clamping plate assemblies such that the clamping table outer faces are substantially flush with the forming block end faces and the forming table end faces.

16. The method of claim 13, wherein the step of folding the ply stack about the web fold line comprises:
   positioning a leader wire lengthwise along the ply stack to define a web fold line; and
   folding, using the forming blocks, the ply stack over the leader wire.

17. The method of claim 13, further comprising:
   stitching, using a stitching mechanism, the overlapping layers of the web along a web seam; and
   moving, using lifting mechanisms, the forming block assemblies and clamping plate assemblies away from the web while stitching the web seam.

18. The method of claim 13, further comprising:
   folding a protruding portion of the web along a web-flange fold line to form one or more flanges.

19. The method of claim 18, further comprising:
   applying a tear strap over the one or more flanges; and
   clamping, using the clamping plates, the tear strap and the one or more flanges against the forming block end face and the forming table end face.

20. The method of claim 18, further comprising:
   stitching, using a stitching mechanism, a tear strap to the one or more flanges along a flange seam.

21. The method of claim 20, further comprising:
   moving, using lifting mechanisms, the forming block assemblies and the clamping plate assemblies away from the web while stitching the flange seam.

* * * * *